United States Patent
Morris et al.

(10) Patent No.: US 6,531,059 B1
(45) Date of Patent: *Mar. 11, 2003

(54) SUSPENDED RUNOFF WATER FILTER

(75) Inventors: James F. Morris, Tucson, AZ (US); Stephen C. Stelpstra, Tuscon, AZ (US)

(73) Assignee: Abtech Industries, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/711,829

(22) Filed: Nov. 13, 2000

Related U.S. Application Data

(60) Provisional application No. 60/238,857, filed on Oct. 5, 2000.

(51) Int. Cl.$^7$ ................................................. E03F 5/06
(52) U.S. Cl. ........................ 210/164; 210/170; 210/448; 210/485; 210/510.1; 404/4
(58) Field of Search ................................. 210/163, 164, 210/170, 448, 452, 485, 510.1; 404/4, 5

(56) References Cited

U.S. PATENT DOCUMENTS

| | | | |
|---|---|---|---|
| 248,559 A | 10/1881 | Jackson | |
| 425,641 A | 4/1890 | Van De Walle | |
| 530,816 A | 12/1894 | Wright | |
| 543,740 A | 7/1895 | Kuhns | |
| 1,032,700 A | 7/1912 | Pickett | |
| 1,164,527 A | 12/1915 | Kelly, Jr. | |
| 1,274,227 A | 7/1918 | Woodson | |
| 1,363,792 A | * 12/1920 | Johnston | 210/164 |
| 1,471,819 A | 10/1923 | Bauschard | |
| 1,935,642 A | 11/1933 | Laughlin | 210/45 |
| 1,972,513 A | 9/1934 | Drehmann | 182/31 |
| 2,102,310 A | 12/1937 | Egan | 182/2 |
| 2,182,795 A | 12/1939 | Day | 182/31 |
| 2,467,021 A | 4/1949 | Fischer | 210/44 |
| 2,557,079 A | 6/1951 | Cutri | 294/77 |
| 2,615,526 A | * 10/1952 | Lane | 210/164 |

(List continued on next page.)

FOREIGN PATENT DOCUMENTS

| | | |
|---|---|---|
| CH | 613245 | 9/1979 |
| DE | 136162 | 6/1979 |

(List continued on next page.)

OTHER PUBLICATIONS

Fam, Sami, Michael K. Stenstron, and Gary Silverman, "Hydrocarbons in Urban Runoff," *Journal of Environmental Engineering*, vol. 113, No. 5, Oct. 1987, pp. 1032–1046.

"Block Copolymers," *Polymer Handbook*, p. 34 (Wiley, 3$^{rd}$ Edition 1989).

(List continued on next page.)

Primary Examiner—Christopher Upton
(74) Attorney, Agent, or Firm—Louis J. Hoffman; Edwin A. Suominen

(57) ABSTRACT

One of the exemplary filter systems described includes a bracket and a filter module that can be suspended from the bracket by a plurality of flexible supports. The bracket can support the filter system beneath the grate of a storm drain without the need for the filter system to be attached to the grate. The grate can be lifted out of the storm drain separately from the filter unit, which allows the filter system to be lifted without the added weight of the grate. When the grate has been lifted out of the way, a suitable fastener structure can be attached to the bracket of the filter system to make the use of mechanical lifting devices more convenient. The bracket can be manufactured to known dimensions, or it can be offered from among a set of brackets that are pre-configured for known storm drain dimensions or as a standard bracket that can be modified to fit the dimensions of a particular storm drain.

44 Claims, 15 Drawing Sheets

U.S. PATENT DOCUMENTS

| | | | |
|---|---|---|---|
| 2,813,745 A | 11/1957 | Frieder et al. | 294/77 |
| 2,889,928 A | 6/1959 | Sisk | 210/163 |
| 3,147,216 A | 9/1964 | Oemler | 210/693 |
| 3,221,888 A | 12/1965 | Muller | 210/333 |
| 3,246,582 A | 4/1966 | Wade | 94/33 |
| 3,324,630 A | 6/1967 | Teller et al. | 55/90 |
| 3,415,745 A | 12/1968 | Isaacson | 210/54 |
| 3,494,862 A | 2/1970 | Horowitz | 210/693 |
| 3,518,183 A | 6/1970 | Evans | 210/40 |
| 3,536,616 A | 10/1970 | Kondoh et al. | 210/693 |
| 3,537,587 A | 11/1970 | Kain | 210/242 |
| 3,538,020 A | 11/1970 | Heskett et al. | 210/496 |
| 3,539,013 A | 11/1970 | Smith | 210/242 |
| 3,565,257 A | 2/1971 | Cavalieri | 210/242 |
| 3,567,660 A | 3/1971 | Winkler | 260/2.3 |
| 3,594,335 A | 7/1971 | Schultz et al. | 260/2.5 |
| 3,607,741 A | 9/1971 | Sohnius | 210/242.4 |
| 3,607,793 A | 9/1971 | Mahlman | 260/93.7 |
| 3,617,565 A | 11/1971 | Fahlvik | 210/691 |
| 3,617,566 A | 11/1971 | Oshima et al. | 210/242.4 |
| 3,667,235 A | 6/1972 | Preus et al. | 61/1 |
| 3,667,608 A | 6/1972 | Burroughs et al. | 210/242 |
| 3,679,058 A | 7/1972 | Smith | 210/242 |
| 3,681,237 A | 8/1972 | Orban | 210/680 |
| 3,702,657 A | 11/1972 | Cunningham et al. | 210/242 |
| 3,713,539 A | 1/1973 | Thompson et al. | 210/164 |
| 3,739,913 A | 6/1973 | Bogosian | 210/924 |
| 3,756,948 A | 9/1973 | Weinberg | 210/693 |
| 3,783,621 A | 1/1974 | Preus et al. | 61/1 F |
| 3,800,950 A | 4/1974 | Hess et al. | 210/242.4 |
| 3,831,760 A | 8/1974 | Economy et al. | 210/242 |
| 3,837,494 A | 9/1974 | Stevenson | 210/259 |
| 3,868,322 A | 2/1975 | Orloff | 210/108 |
| 3,888,766 A | 6/1975 | DeYoung | 210/693 |
| 3,915,859 A | 10/1975 | Sundin et al. | 210/104 |
| 3,916,969 A | 11/1975 | Auerbach et al. | 152/354 |
| 3,923,472 A | 12/1975 | Martinez et al. | 44/50 |
| 3,929,631 A | 12/1975 | Winkler | 210/36 |
| 4,002,177 A | 1/1977 | Rainer et al. | 131/10 R |
| 4,031,839 A | 6/1977 | Pedone | 114/270 |
| 4,039,489 A | 8/1977 | Fletcher et al. | 210/924 |
| 4,052,306 A | 10/1977 | Schwartz et al. | 210/242 S |
| 4,060,487 A | 11/1977 | Samsel | 210/923 |
| 4,061,807 A | 12/1977 | Shaler et al. | 210/502 |
| 4,065,923 A | 1/1978 | Preus | 61/1 F |
| 4,070,287 A | 1/1978 | Wiegand et al. | 210/693 |
| 4,084,380 A | 4/1978 | Hallhagen | 61/1 F |
| 4,099,619 A | 7/1978 | Hudler et al. | 206/524.1 |
| 4,102,783 A | 7/1978 | Zenno et al. | 210/36 |
| 4,111,813 A | 9/1978 | Preus | 210/282 |
| RE29,996 E | 5/1979 | Jordan et al. | 210/281 |
| 4,206,080 A | 6/1980 | Sato et al. | 252/430 |
| 4,207,378 A | 6/1980 | Klein | 428/402 |
| 4,248,758 A | 2/1981 | Wright | 260/33.6 |
| 4,261,823 A | 4/1981 | Gallagher et al. | 210/164 |
| 4,264,444 A | 4/1981 | Bronnec | 210/923 |
| 4,332,854 A | 6/1982 | Parker | 210/924 |
| 4,366,067 A | 12/1982 | Golding et al. | 210/67 I |
| 4,401,475 A | 8/1983 | Eriksson et al. | 210/924 |
| 4,419,232 A | 12/1983 | Arntyr et al. | 210/164 |
| 4,420,400 A | 12/1983 | Weitzen | 210/710 |
| 4,427,157 A | 1/1984 | Klein | 210/160 |
| 4,429,065 A | 1/1984 | Gancy | 523/223 |
| 4,439,324 A | 3/1984 | Crotti | 210/924 |
| 4,454,039 A | 6/1984 | McCoy | 210/164 |
| 4,497,663 A | 2/1985 | Fisher et al. | 134/4 |
| 4,497,712 A | 2/1985 | Crowling | 210/242.4 |
| 4,519,431 A | 5/1985 | Yoshimura et al. | 152/209 R |
| 4,519,918 A | 5/1985 | Ericsson et al. | 210/680 |
| 4,560,718 A | 12/1985 | Ritchey | 524/13 |
| 4,592,690 A | 6/1986 | Busch | 413/19 |
| 4,594,157 A | 6/1986 | McGowan | 210/163 |
| 4,640,730 A | 2/1987 | Streets et al. | 156/334 |
| 4,672,781 A | 6/1987 | Pichon | 52/94 |
| 4,737,394 A | 4/1988 | Zafiroglu | 210/694 |
| 4,740,435 A | 4/1988 | Markin et al. | 429/174 |
| 4,776,722 A | 10/1988 | Gaudin | 404/25 |
| 4,801,386 A | 1/1989 | Sugimori et al. | 210/680 |
| 4,919,820 A | 4/1990 | Lafay et al. | 210/671 |
| 4,929,329 A | 5/1990 | Beckman | 210/151 |
| 4,941,978 A | 7/1990 | Gabrick | 210/693 |
| 4,965,129 A | 10/1990 | Bair et al. | 210/924 |
| 4,980,229 A | 12/1990 | Park et al. | 428/327 |
| 5,009,790 A | 4/1991 | Bustamante et al. | 210/242.4 |
| 5,032,640 A | 7/1991 | Fachini | 524/426 |
| 5,037,541 A | 8/1991 | Ruey-Jang et al. | 210/141 |
| 5,071,564 A | 12/1991 | Stein et al. | 210/924 |
| 5,075,014 A | 12/1991 | Sullivan | 210/776 |
| 5,104,548 A | 4/1992 | Gabrick | 210/680 |
| 5,133,619 A | 7/1992 | Murfae et al. | 404/4 |
| 5,135,578 A | 8/1992 | Billings | 210/924 |
| 5,135,660 A | 8/1992 | Chromecek et al. | 210/671 |
| 5,159,016 A | 10/1992 | Inoue et al. | 525/92 |
| 5,165,821 A | 11/1992 | Fischer et al. | 405/63 |
| 5,173,182 A | 12/1992 | Debellian | 210/170 |
| 5,179,611 A | 1/1993 | Umeda et al. | 385/110 |
| 5,180,704 A | 1/1993 | Reindl et al. | 502/402 |
| 5,181,802 A | 1/1993 | Thengs et al. | 405/70 |
| 5,186,831 A | 2/1993 | DePetris | 210/924 |
| 5,207,901 A | 5/1993 | Ravagnan | 210/173 |
| 5,211,858 A | 5/1993 | Dovan et al. | 252/8.551 |
| 5,223,154 A | 6/1993 | MacPherson, Jr. et al. | 210/790 |
| 5,227,072 A | 7/1993 | Brinkley | 210/924 |
| 5,232,587 A | 8/1993 | Hegemier et al. | 210/162 |
| 5,248,729 A | 9/1993 | Inoue et al. | 525/92 |
| 5,252,215 A | 10/1993 | McFarlane et al. | 210/69.1 |
| 5,256,226 A | 10/1993 | Marzola et al. | 156/95 |
| 5,278,217 A | 1/1994 | Umeda et al. | 524/394 |
| 5,281,463 A | 1/1994 | Cotton | 428/126 |
| 5,284,580 A | 2/1994 | Shyh | 210/163 |
| 5,297,367 A | 3/1994 | Sainz | 52/12 |
| 5,304,311 A | 4/1994 | Codiglia | 210/693 |
| 5,324,429 A | 6/1994 | Holland | 210/484 |
| 5,330,651 A | 7/1994 | Robertson | 210/617 |
| 5,360,548 A | 11/1994 | Stein et al. | 210/693 |
| 5,364,535 A | 11/1994 | Buckalew | 210/671 |
| 5,374,600 A | 12/1994 | Hozumi et al. | 502/402 |
| 5,391,295 A | 2/1995 | Wilcox et al. | 210/165 |
| 5,403,474 A | 4/1995 | Emery | 210/163 |
| 5,405,539 A | 4/1995 | Schneider | 210/747 |
| 5,407,575 A | 4/1995 | Vinsonhaler | 210/924 |
| 5,414,029 A | 5/1995 | Lemoine et al. | 524/60 |
| 5,423,985 A | 6/1995 | Addeo et al. | 210/924 |
| 5,427,679 A * | 6/1995 | Daniels | 210/485 |
| 5,428,085 A | 6/1995 | Burel et al. | 524/59 |
| 5,432,000 A | 7/1995 | Young, Sr. et al. | 428/372 |
| 5,439,590 A | 8/1995 | Steffan | 210/616 |
| 5,468,539 A | 11/1995 | Crivelli | 428/141 |
| 5,480,254 A | 1/1996 | Autry et al. | 404/2 |
| 5,496,865 A | 3/1996 | Heese et al. | 521/79 |
| 5,511,904 A | 4/1996 | Van Egmond | 405/52 |
| 5,516,845 A | 5/1996 | Heese et al. | 525/193 |
| 5,573,349 A | 11/1996 | Paoluccio | 405/52 |
| 5,575,925 A | 11/1996 | Logue, Jr. | 210/747 |
| 5,624,576 A | 4/1997 | Lenhart et al. | 210/767 |
| 5,632,889 A | 5/1997 | Tharp | 210/165 |
| 5,641,847 A | 6/1997 | Hozumi et al. | 526/328.5 |
| 5,679,246 A | 10/1997 | Wilcox et al. | 210/165 |
| 5,707,527 A | 1/1998 | Knutson et al. | 210/660 |
| 5,712,358 A | 1/1998 | Sojka | 526/323.2 |
| 5,720,574 A | 2/1998 | Barella | 405/52 |

| | | | |
|---|---|---|---|
| 5,725,782 A | 3/1998 | Chinn et al. | 210/767 |
| 5,733,445 A | 3/1998 | Fanelli | 210/164 |
| 5,744,048 A | 4/1998 | Stetler | 210/803 |
| 5,762,790 A | 6/1998 | Zoeller | 210/238 |
| 5,767,060 A | 6/1998 | Hanrahan | 210/502.1 |
| 5,788,849 A | 8/1998 | Hutter, Jr. et al. | 210/163 |
| 5,820,762 A | 10/1998 | Bamer et al. | 210/661 |
| 5,830,967 A | 11/1998 | Sojka | 526/323.2 |
| 5,834,577 A | 11/1998 | Sojka | 526/323.2 |
| 5,849,198 A | 12/1998 | Sharpless | 210/693 |
| 5,863,440 A | 1/1999 | Rink et al. | 210/693 |
| 5,869,555 A | 2/1999 | Simmons et al. | 524/229 |
| 5,925,241 A | 7/1999 | Aldridge et al. | 210/163 |
| 5,955,552 A | 9/1999 | Sojka | 526/88 |
| 5,958,226 A | 9/1999 | Fleischmann | 210/165 |
| 5,985,157 A * | 11/1999 | Leckner et al. | 210/485 |
| 6,080,307 A | 6/2000 | Morris et al. | 210/163 |
| 6,086,758 A * | 7/2000 | Schilling et al. | 210/163 |
| 6,106,706 A * | 8/2000 | Roy et al. | 210/164 |
| 6,106,707 A | 8/2000 | Morris et al. | 210/163 |
| 6,261,444 B1 * | 7/2001 | Forse | 210/163 |
| 6,214,216 B1 * | 10/2001 | Isaacson | 404/4 |

FOREIGN PATENT DOCUMENTS

| | | |
|---|---|---|
| DE | 2904428 | 8/1980 |
| DE | 3122219 A1 | 6/1981 |
| DE | 3122219 A1 | 3/1982 |
| DE | 3634289 | 4/1988 |
| DE | 41 36 647 A1 | 12/1992 |
| EP | 0484061 A1 | 5/1992 |
| EP | 0518336 A1 | 12/1992 |
| GB | 7109 | 12/1905 |
| GB | 13514 | 7/1983 |
| JP | 4-371203 | 12/1992 |

OTHER PUBLICATIONS

"Selection Criteria and Laboratory Evaluation of Oilspill Sorbents," *Environmental Protection Series*, Report EPS 3/SP/3, pp. 1–73 (Jun. 1991).
"Environmental Spill Encapsulant Polymers," *JRM Chemical Form 550 product brochure* (Aug. 1993).
Rushefsky, "Old Tires Now Can Now Be Recycled," *Staten Island Advance* (Oct. 22, 1993).
"Titan Tech Attacks Tire Recycling Mess," *American Metal Market* (Oct. 26, 1993).
Alexander, "Bradley is Center of World Attention this Week" *Chickasha Daily Express* (Nov. 4, 1993).
"Business & Technology," *Solid Waste Report*, vol. 24, No. 43, p. 346 (Nov. 4, 1993).
"A Cooler Way to Melt Junked Tires," *Business Week* (Nov. 8, 1993).
Schulman, "A New Spin on Old Tires," *Newsweek* (Nov. 15, 1993).
"Titan Develops Tyre & Plastics Recycling," *HazNews* (Dec. 1993).
Kokish, "Titan Opens Pyrolysis Plants in South Korea," *Tire Business* (Dec. 13, 1993).
Metz, "N.M. Firm is Ready to Roll into the Tire Recycling Industry," *The Boston Globe* (Dec. 28, 1993).

"High–Tech Breakthroughs," *Boardroom Reports* (Jan. 1, 1994).
Kansas, "Catalysts and Beams Take Aim at Wastes," *The Wall Street Journal* (Jan. 21, 1994).
"Recycling News," *Green Alternatives*, vol. 4, No. 1 (Feb./Mar. 1994).
"Titan Technologies, Inc.," *Conservative Speculator* (Jun. 1994).
"Titan Technologies, Inc.," *Investor's NewsWire*, p. All (Sep, 9, 1994).
DiChristina, "Mired in Tires," *Popular Science* (Oct. 1994).
McDonagh, et al., "Handling and Disposal of Oil Waste from Oil Spills at Sea," paper presented at Long Beach Oil Spill Conference (Feb. 27, 1995).
Cassidy, "Titan Potential," *MoneyWorld* (Apr. 1995), pp. 18–21.
Titan Technologies, Inc. Investor's Booklet.
Kristar Enterprises, Fossil Filter, brochure (9/96).
Materials re: King Country Evaluation of Commercially Available Catch Basin Inserts for Treatment of Stormwater Runoff from Developed Sites, 10/95.
Shepp, David L., "Petroleum Hydrocarbon Concentrations Observed in Runoff from Discrete, Urbanized Automotive–Intensive Land Uses," *Watershed '96 Conference Proceedings*, pp. 220–223.
Imtech–Imbivitive Technologies Corporation product literature re "Imbiber Beads," 1993, 1996, 1997.
"HydroCartridges/Rubberizer" product literature, 1994–97.
Aqua Treatment Systems, Inc./"Absorbent W" product literature. 1996–97.
"Innovative Stormwater Treatment Products & Services Guide," prepared for the Stormwater Technologies Trade Shows, Nov. 17 & 19, 1997 (discussing several products, some of which were commercially available before Jun. 1997).
Suntree Isles, Inc. "Curb Inlet Basket" product literature 1995–96.
Inventive Resources, Inc. "Water Decontamination" product literature (4/98).
"Petrosorb HGPPL–1 Petroleum Product Spill Encapsulant," *Petrosorb product brochure* (source and date unknown).
"First in Thirst," *Matasorb Industrial Sorbents product brochure* (sourch and date unknown).
Pacific Fluid System, Corp. "Linductor Oil Recovery and Bulk Transfer System Booklet.".
"Fact Sheets," *Team One USA Challenger Product Information*.
Fingas, Mervis F., et al. "The Newfoundland Offshore Burn Experiment–Nobe.".
Buist, Ian A., et al. "In–Situ Burning of Alaska North Slope Emulsions.".
Guenette, Chantal, et al. "Studies of In–Situ Burning of Emulsions in Norway.".

* cited by examiner

FIG. 21 $\left\{ \vec{T}_1 = \vec{V}_1 \times \vec{L}_1 \right.$

FIG. 22 $\left\{ \vec{T}_2 = \vec{V}_2 \times \vec{L}_2 \right.$

FIG. 23 $\left\{ |\vec{T}_1| = |\vec{T}_2| \right.$

FIG. 24 $\left\{ |\vec{V}_1| |\vec{L}_1| \sin\emptyset = |\vec{V}_2| |\vec{L}_2| \sin\alpha \right.$ FIG. 25 $\left\{ |V_2| = |V_1| \dfrac{|L_1| \sin\emptyset}{|L_2| \sin\alpha} \right.$ FIG. 26 $\left\{ |\vec{V}_3| = |\vec{V}_4| \tan\theta = |\vec{V}_1| \tan\theta \right.$ FIG. 27 $\left\{ \begin{array}{l} \text{FOR } |\vec{V}_3| > |\vec{V}_2|, \\ \tan\theta > \dfrac{|\vec{L}_1| \sin\emptyset}{|\vec{L}_2| \sin\alpha} \end{array} \right.$

SUSPENDED RUNOFF WATER FILTER

This application claims benefit of U.S. Provisional Application No. 60/238,857, filed Oct. 5, 2000 and entitled "Suspended Runoff Water Filter.

BACKGROUND OF THE INVENTION

Typical water runoff contains a surprisingly large amount of oil and other contaminants. The resulting contamination of natural receiving water incurs enormous annual costs, both financial and environmental. For example, a government study in one published article showed that storm water sampled from street sites contained an "event mean concentration" of 2.2 mg. of oil per liter of runoff water. Shepp, "Petroleum Hydrocarbon Concentrations Observed in Runoff from Discrete, Urbanized Automotive-Intensive Land Uses," Watershed '96. If one meter of rain per year falls on a street 10 meters wide, then at that observed mean rate, the annual runoff from each kilometer of street will- contain about 275 liters of hydrocarbons.

To mitigate this problem, various types of filters have been developed for use in water drains. For example, U.S. Pat. No. 5,849,198 to Sharpless discloses a filter cartridge containing oil absorbing material, which is suspended below the grate of a storm drain by flexible suspension elements such as chains. The top of each of the flexible suspension elements terminates at an attachment element that engages the grate of the storm drain.

To maintain its effectiveness, a runoff filter or catchment basin requires regular maintenance. Filter modules or cartridges containing filter media must be replaced or serviced when the media becomes saturated. The Sharpless patent teaches a replacement technique in which the filter cartridge is lifted up and out of the drain's catch basin as the grate is removed. This process requires simultaneous lifting of the weight of the grate and the filter cartridge. Typically, a filter cartridge being replaced contains accumulated trash or saturated filter media or both, and it can be very heavy. Considerable force is needed to dislodge a heavy metal rate from its catch basin and lift the grate and the filter cartridge out of the basin together.

In view of these and other problems associated with conventional runoff filters, the need remains for improved runoff filters that can be more easily maintained while still accommodating excess runoff under storm conditions. A further need remains for runoff filters that can be more efficiently manufactured, stored, and shipped and disposed of with reduced environmental consequences.

SUMMARY OF THE INVENTION

A filter system according to various aspects of the present invention includes a bracket and a filter module suspended from the bracket by a plurality of flexible supports. The bracket supports the filter system beneath the grate of a storm drain without the need for the filter system to be attached to the grate. Advantageously, the grate can be lifted out of the storm drain before and separately from the filter unit for replacement, servicing, or cleaning of the filter module. After the grate has been removed, a vacuum hose can be inserted into the filter module for removal of trash and debris. In addition, this capability allows the filter system to be lifted without the added weight of the grate. When the grate has been lifted out of the way, suitable fasteners can attach the filter unit to the bracket of the filter system to make the use of mechanical lifting devices more convenient.

The use of flexible supports allows suspension of the filter module from the bracket in more storm drain configurations than would be possible with a rigid arrangement. Flexible supports permit the filter module to deviate from hanging directly beneath the bracket, thus allowing the filter module to fit into the storm drain even when obstructions protrude into the volume directly beneath the bracket.

According to one aspect of the invention, the filter system can employ a bracket sized to be supported without the need for fasteners to either the grate or the edges of the storm drain. Such a bracket includes a flat supporting edge structure along at least a portion of its perimeter. The supporting edge structure extends outward from the bracket so that the edge structure can be supported along the edges of the storm drain and held in place by the weight of the grate. By avoiding the need for fasteners, a filter system having such a bracket can be more conveniently lifted out of the storm drain. The bracket can be manufactured to known dimensions. Advantageously, the bracket can be marketed by offering it from among a set of brackets that are pre-configured for known storm drain dimensions or as a standard bracket that can be modified to fit the dimensions of a particular storm drain.

According to another aspect of the invention, the filter system can employ a filter module that includes filter media disposed about an open recess. Such a configuration permits trash to accumulate in a region surrounded by filter media. Surprisingly, accumulated trash actually enhances performance of the filter module by improving hydrocarbon removal efficiency. In the presence of water, many types of contaminants tend to stick to the materials typically found in trash from urban runoff. By permitting trash to accumulate in a region surrounded by a filter media, the filter module advantageously employs trash as a cost-free pre-filtering media. Indeed, the trash can be removed several times over the useful life of the filter media, if desired. This advantageous filter module configuration makes maintenance easier by providing convenient access to a person inserting a vacuum hose or reaching down from above the storm drain to clean out the accumulated trash.

A filter system according to another aspect of the invention includes a tray supporting the filter module, that can couple to the bracket by flexible supports. In such a system, the filter module is configured such that its bottom can rest on the tray. By providing a tray to support the bottom of the filter module, the filter module can require less supporting structure. With less structure, the filter module has less material requiring disposal and consequently can be manufactured less expensively and reduce adverse environmental impact.

In a filter system according to another aspect of the invention, the filter module includes a sectional shell, which includes a plurality of planar sections. The sections are joined together such that each section is bendably joined to an adjacent section. In a first (stored) configuration, the sections lie substantially in the same plane. In a second (assembled) configuration, the sections do not all lie substantially in the same plane and the sections substantially enclose the filter media. Advantageously, the sectional shell can assemble entirely from planar sections, simplifying manufacturing and permitting flat storage of the shell's components before assembly. By bonding the planar sections together using ultrasonic welding, according to a particular aspect of the invention, fasteners such as rivets or staples can be avoided, which further simplifies manufacturing. In addition, the need for disposing of multiple types of material, and consequent adverse environmental impact, is reduced. The planar sections can be fabricated from a single piece of sheet material, still further simplifying manufacturing.

According to another aspect of the invention, filter media can have the form of a coherent block of agglomerated fragments. Advantageously, a filter module including media in that form requires less structure to support the media.

According to another aspect of the invention, the bracket can be advantageously configured to act as a funnel. By directing water downward to the filter module, a bracket having such a configuration helps maximize the amount of water that passes through the filter module.

According to a method of the invention, purity of water entering a storm drain having a grate can be improved by installing and replacing filter modules in the storm drain. A first filter module suspends from at least two edges of the storm drain below the grate. To replace the first filter module with a second filter module (of the same or a different type), the grate is removed from the storm drain while the first filter module remains suspended from the edges of the storm drain. The first filter module is then lifted out of the storm drain and replaced with the second filter module. Other aspects of the invention reside in tools useful for such lifting.

The above summary does not contain an exhaustive list of all aspects of the present invention. Indeed, the inventors contemplate that their invention includes all systems and methods that can be practiced from all suitable combinations of the various aspects summarized above, as :well as those disclosed in the detailed description below and particularly pointed out in the claims filed with the application. Such combinations have particular advantages that may or may not be specifically recited in the above summary.

BRIEF DESCRIPTION OF THE DRAWINGS

Various embodiments of the present invention are described below with reference to the drawings, wherein like designations denote like elements.

FIGS. 21–27 are mathematical formulas relating to FIG. 20.

DESCRIPTION OF PREFERRED EXEMPLARY EMBODIMENTS

Figure 1:
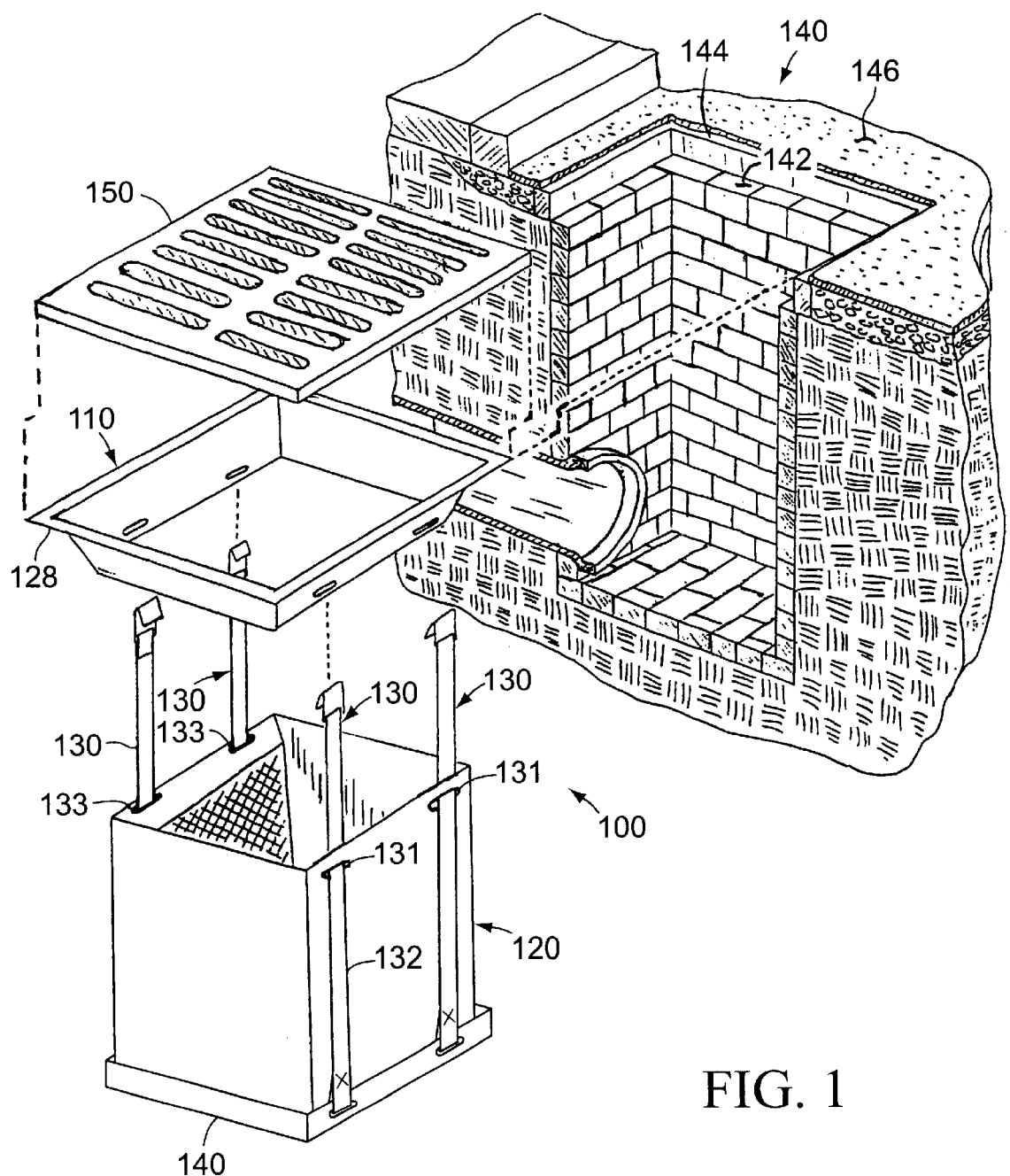
FIG. 1 is an exploded perspective view of a filter system according to various aspects of the invention along with a cutaway perspective view of a storm drain with the filter system installed.
Figure 2:
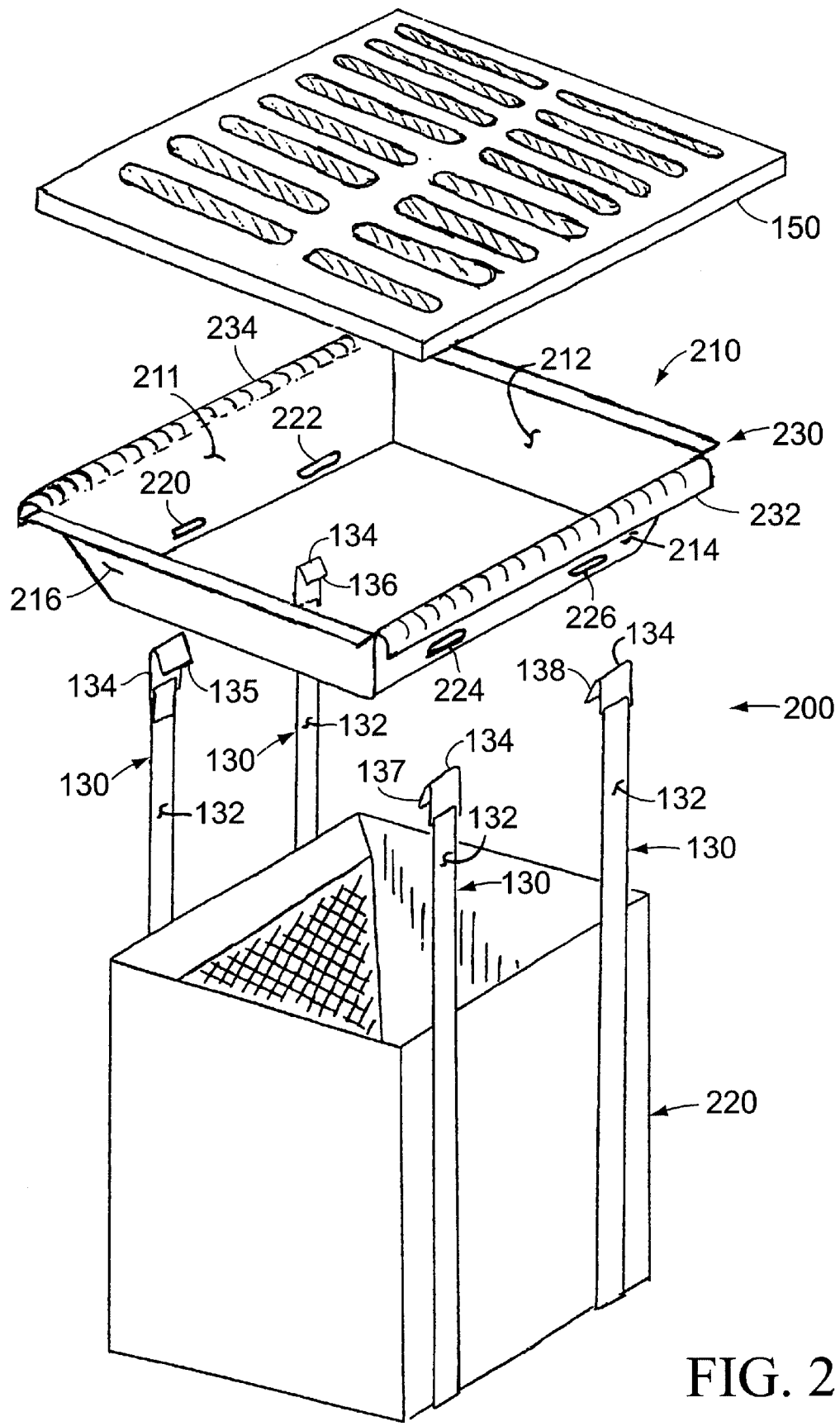
FIG. 2 is a perspective view of another filter system and a grate according to various aspects of the invention.

A filter system according to various aspects of the present invention provides a number of benefits including ease of maintenance, suitability for a variety of storm drain configurations, and relatively unobstructed access to at least some filter media even in the presence of accumulated trash. Such a filter system includes, in various advantageous configurations, a bracket and a filter module suspended from the bracket by a plurality of flexible supports. For example, exemplary filter system 100 of FIG. 1 includes a funnel-shaped bracket 110 and a filter module 120 suspended from bracket 110 by the combination of a tray 140 and four flexible supports 130. Each of supports 130 includes a hook-type coupling 134 (FIG. 2). Other coupling structures, such as a "double 'D' ring," can also be suitably employed.

Bracket 110 rests on a ledge 144 of storm drain 140 to support filter system 100. A grate 150 may also rest, on ledge 144, on top of bracket 110. The top of grate 150 is typically substantially level (i.e., at the same height) with pavement 146 surrounding drain 140. Grate 150 does not attach to bracket 110, nor does bracket 110 fasten to ledge 144.

Another exemplary filter system 200 (see FIG. 2) employs supports 130 and a bracket 210 having some common features with bracket, 110. However, system 200 omits a tray for supporting its filter module 220. Instead, filter module 220 suspends directly from bracket 210 by supports 130.

Still another exemplary filter system 300 (see FIG. 3) employs bracket 210 and filter module 220. Like system 200, system 300 omits a tray for supporting filter module 220. In system 300, however, supports 230 include tab-and-slot couplings 800 for suspending filter module 220 from bracket 210.

A bracket according to various aspects of the invention includes any structure suitable to support a filter module within a storm drain. Particularly advantageous features of bracket 210 may be better understood with reference to FIG. 2. Bracket 210 is comprised of four sides 211, 212, 214, and 216, which can be portions of a single piece of thermoformed plastic or separate pieces joined together at adjacent edges to form an upper and lower opening to bracket 210.

The sides of exemplary bracket 210 are angled outward such that the upper opening is larger than the lower opening.

Sides 211 and 214, which are opposite, include respective pairs of slots 220, 222 and 224, 226. The slots facilitate convenient attachment and detachment of filter module 120 to bracket 110.

A bracket according to various aspects of the invention can include a flat supporting edge structure along at least a portion of its perimeter. Such structure can be of any type suitable for extending outward from the bracket to support the bracket (and a filter module suspended from it) from surrounding structure of a storm drain. For example, bracket 110 includes a flat supporting edge structure 128 around its entire perimeter. In the embodiment of FIG. 1, edge structure 128 extends outward from bracket 110 on each of the four sides of bracket 110. In the installation of FIG. 1, edge structure 128 rests on an upper ledge that would otherwise only support grate 150. Grate 150 rests on top of supporting edge structure 128. In an alternative installation (not shown), an edge structure having a slightly smaller perimeter can rest on interior ledge 142 of storm drain 140.

A supporting edge structure can be integral to the bracket. As may be better understood with respect to FIG. 2, for example, bracket 210 includes sides 211, 212, 214, and 216 and various portions of supporting edge structure 230 that can all be fabricated from the same piece of material. Suitable materials include molded ABS plastic, glass filled ABS plastic, stamped and drawn steel, and welded steel. In a variation, sides 211, 212, 214, and 216 can be fabricated together with respective portions of supporting edge structure 230 and joined by any suitable fasteners or bonding. Other variations include fabricating supporting edge structure 230 as a rectangular "ring" and fabricating edge structure 230 in four separate sections. In non-rectangular (e.g., circular) brackets, still other variations of edge structure can be employed.

Figure 11:
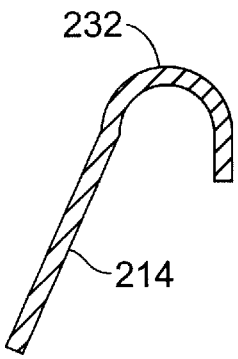
FIG. 11 is a side view of a stiffening member included in the bracket of the system of FIG. 2.

The edge structure of a bracket according to the invention need not extend outward from the entire perimeter of the bracket, although that is an advantageous configuration when the shape of the storm drain permits it. A bracket can include one or more portions from which edge structure does not extend outwardly. In bracket 210 of FIG. 2, for example, edge structure 230 extends from a portion of the bracket's perimeter, namely near sides 212 and 216. Two stiffeners 232 and 234 extend along the portions from which structure 230 does not extend outwardly, namely near sides 211 and 214. Stiffeners 232 and 234 maintain rigidity of structure 230 along those portions to compensate for the reduced support. Stiffeners of any suitable type can be used to maintain rigidity. For example, stiffeners 232 and 234 are partially tubular members, preferably fabricated from material of the same type from which the rest of bracket 210 is fabricated. FIG. 11 is a cross-sectional view of stiffener 232 and side 214 to which it is attached.

In some installations where the bracket is unsupported on one side, it may be advantageous for the unsupported side to have a "backsplash" panel (not shown) extending upwards by a few inches. For example, the unsupported side of the bracket may be adjacent to an open street-side cutter, in which case the backsplash panel can help prevent water from flowing over the unsupported side of the bracket and directly into the gutter. Consequently, the backsplash panel can help limit the amount of unfiltered water entering the gutter in such an installation.

A filter module according to various aspects of the invention includes any structure to hold filter media such that contaminated (i.e., containing undesired chemicals or matter) liquid can pass into the filter module and through the media, emerging, less contaminated than it entered. For example, a filter module suspended below the rate of the storm drain can remove hydrocarbons from runoff water. Such a filter module catches the runoff water as it enters the storm drain, passes it through suitable media that sorbs the hydrocarbon content, and then allows the filtered water to pass Out to the drain. Exemplary filter: module 120 (FIG. 1) suspends from bracket,110 by four flexible supports 130, which attach to filter module 120 along, two opposite sides by suitable fasteners (not shown).

A flexible support structure according to various aspects of the invention includes any suitable materials in any suitable configuration to sustain tensile force and thus suspend one structure from another. Such structure can include several flexible supports. Such a configuration provides particular advantages. One important advantage is that it provides a bypass route for water that cannot pass through a filter module suspended from the supports, as can be expected under overflow conditions or when filter media in the module is saturated. In system 100, for example, water that cannot pass through filter module 120 (because of excess flow, blockage, or saturation) can pour over the top edge of filter module 120, passing, through the open space between bracket 110 and module 120. (Support members 130 obstruct this open space very little.) In variations where this and other benefits of multiple supports are not required or less critical, a flexible structure can be employed that may be viewed as having a single structural member, such as a mesh net that attaches to multiple points around the perimeters of both the bracket and the filter module.

A support structure having four individual flexible support members can be used to suspend a filter module having a rectangular cross section, with one support providing suspension at or near each corner of the module. A structure having, three flexible support members can be used to suspend a filter module having a triangular or circular cross section, with the support members spaced roughly 120 degrees about the center of the module's cross section. Each of the multiple support members can include a respective releasable coupling to facilitate attachment to either or both of the filter module or bracket of the filter system (e.g., module 120, bracket 110, or both). Each support member can connect one point of the filter module to one or more points of the bracket, or vice versa. A support member can begin at the filter module, thread through a hole in or hook on the bracket, and return to a different point on the filter module. Two or more support members can share a slot on the bracket and extend to the same or different support points on the filter module.

In exemplary system 100, flexible support members 130 include lengths of polypropylene webbing 132 with releasable couplings 134 at one end of each strip for releasable attachment to bracket 110. In the exploded view of FIG. 1, support members 130 are depicted as extending above filter module 120 because support members 130 suspend filter module 120 from bracket 110 in operation of filter system 100. The lower ends of members 130 can pass in and out of the upper portion of filter module 120 via four inside slots 133 and four outside slots 131. (Only two of each are shown in FIG. 1.) In exemplary system 100, support members 130 pass through a total of eight slots in filter module 120 and travel within an upper portion of the filter compartment of filter module 120. That immediate portion must be kept clear of filter media to allow passage of members 130. In an advantageous variation of a system in which the filter module has opposite exposed side walls, support members can simply pass through the exposed side walls near. (e.g., within about 2 inches) the top of the module. In such a variation, the support members lead downward from the outward side of the side walls to the bottom of the filter module or a supporting tray. No passage need be cleared within the filter compartment of such a system's filter module.

Passing support members through slots in the side of a filter module, near its top, helps to stabilize the filter module and prevent it from falling over, for example if it somehow becomes top-heavy. In systems where the filter module is suspended by a tray rather by direct attachment to the support members, the stability that the slots impart helps keep the filter module mounted on the tray. In variations where the benefits of such stability are not required, or in variations such as system 200 (FIG. 2) where the stability is provided by attachment of support members near the top of the filter module as well as its bottom, the filter module may omit the slots.

Flexible support structure according to various aspects of the invention provides little or no resistance to lateral forces. For example, ordinary chains or ropes employed as flexible support members only provide resistance to tension from the weight of a lower structure (e.g., a filter module) suspended from an upper structure (e.g., a bracket). Thin plastic strips (e.g., strips of ABS thermoformed plastic) that can be employed as flexible support members primarily provide resistance to tension, but can also provide some resistance to lateral deviation as well, especially in a direction parallel to the plane of the strips. Metallic cables employed as flexible support members provide little resistance to lateral forces but have some rigidity. In a variation, a filter module (or bracket, but probably not both in one system) can include flexible support structure that is integrally fastened to it.

Many storm drains include obstructions (e.g., shifted brickwork, slumped concrete, ladder rungs, inlet or outlet pipes, etc.), such as around the drain's outlet, that prevent a filter module from being suspended directly beneath the grate of the drain. By suspending a filter module from a bracket using a flexible system, a filter system according to various aspects of the invention can be installed even in storm drains having such obstructions. The flexible support structure permits the filter module to be suspended off-axis from directly beneath the grate of drains in which the obstructions push the filter module off to one side.

A bracket can be modified to allow for obstructions in the suspension of the filter module. For example, a bracket suspending a filter module that is offset (i.e., displaced) significantly to one side can be configured to direct water to the offset position. The sides of the bracket can be of different angles or lengths.

Flexible supports can employ any releasable couplings suitable to releasably attach a filter module of the invention to a bracket, as desired. In exemplary systems 100 and 200 of FIGS. 1 and 2, couplings 134 are rigid strips of metal bent to form hook ends. 135, 136, 137, and 138 (FIG. 2). (Other types of hooks, such as those conventionally fabricated from molded plastic, can be employed.) Hook ends 135, 136, 137, and 138 engage slots 220, 222, 224, and 226, respectively, of bracket 210.

Figure 8:
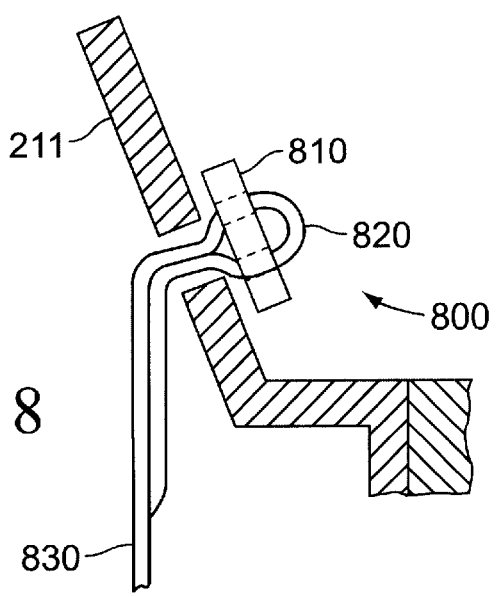
FIG. 8 is a detailed view of a coupling used for flexible supports useful with the system of FIG. 3.

Other types of releasable couplings such as hook/eye combinations and nut/bolt combinations can also be used. As may be understood better with reference to FIGS. 3 and 8, for example, another type of coupling 800 includes a rigid or flexible but durable tab 810 through which fabric of a flexible support 830 can be passed to form a loop 820 at the end of support 830. The end of support 830 can be woven, riveted, sewn, or otherwise attached to an intermediate part of support 830, forming loop 820. Alternatively, support 830 may have two ends, one on either side of loop 820, both of which are attached to the same or different support points for the filter module below. Tab 810 can be inserted through a slot in wall 211 of bracket 210 in an orientation that allows it to fit through the narrow width of the slot. When tension is applied to 830 to support the filter module, one edge of tab 810 contacts wall 211, causing tab 810 to assume an orientation that is roughly perpendicular to the orientation it had upon insertion through the slot in wall 211. In this perpendicular orientation, tab 810 prevents the loop end 820 of support 830 from returning through the slot. To release coupling 800, tension is removed from tab 810 (e.g., when the filter module is resting on pavement next to a storm drain) and tab 810 is reoriented and again passed through the slot.

According to a particularly advantageous aspect of the invention, a filter module can include filter media that is disposed about an open recess. As may be better understood with reference to FIG. 3, for example, filter module 220 includes a compartment 310 for filter media 320 disposed about an open recess 330. Filter module 220 suspends from bracket 210 by supports 830 such that water passing downward through grate 150 and bracket 210 first funnels into open recess 330 through the open top of filter module 220.

Compartment 310 is bounded by surfaces including opposing walls 340 and 350 (and walls not shown in FIG. 3), a permeable floor 360, and a permeable inner basket 365. A surface is said to be permeable when fluids or small-diameter particles can-pass from one side of the surface to another. Examples of suitable permeable surfaces for compartment 310 are metallic mesh, reinforced cloth, paper, plastic with a multitude of small-diameter holes, polyethylene mesh, and polypropylene mesh. In a variation, lower portions of the sides 340, 350, etc. can be made permeable instead of (or together with) floor 360.

Compartment 310 includes filter media 320 of any type suitable for a desired filtering task. For removing hydrocarbons from runoff water, a particularly advantageous type of filter media is comprised of copolymer fragments. This media is discussed below with reference to FIGS. 6 and 7. A few examples of the many other suitable types of media are activated carbon, plant husks, plant shells, and various organic and non-organic materials of the type disclosed in the U.S. patents listed in TABLE I below. The detailed description portions (including referenced drawing figures) of the patents listed in TABLE I are incorporated herein by reference. In addition, the detailed description portions (including referenced drawing figures) of any U.S. patents or patent applications incorporated by reference into patents listed in TABLE I are also specifically incorporated herein by reference.

TABLE I

| U.S. Pat. No. | Inventor(s) | Issued |
| --- | --- | --- |
| 5,767,060 | Hanrahan | Jun. 16, 1998 |
| 5,712,358 | Sojka | Jan. 27, 1998 |
| 5,624,576 | Lenhart et al. | Apr. 29, 1997 |
| 5,374,600 | Hozumi et al. | Dec. 20, 1994 |
| 5,360,548 | Stein et al. | Nov. 1, 1994 |
| 5,304,311 | Codiglia | Apr. 19, 1994 |
| 5,227,072 | Brinkley | Jul. 13, 1993 |

TABLE I-continued

| U.S. Pat. No. | Inventor(s) | Issued |
| --- | --- | --- |
| 5,221,858 | Dovan et al. | May 18, 1993 |
| 5,135,660 | Chromecek et al. | Aug. 4, 1992 |

Filter media according to a particularly advantageous aspect of the invention can be fabricated as a single coherent block of agglomerated fragments. (An exemplary process for forming such a block is discussed in detail below.) A coherent block maintains its structure without separating into large parts (absent destructive forces) while providing passages for fluid flow through the block.

The use of a coherent block of media avoids the need for permeable surfaces to maintain the shape of a compartment within a filter module of the invention. Instead, a block of media can simply be placed within a filter module in any suitable manner that provide structural support for the weight of the media, which can become considerable when the media is saturated.

In one embodiment of a filter module supporting a block of filter media, the block of agglomerated fragments is fabricated to fit within a filter module, resting on the floor of the module. The block can be inserted into or formed in the filter module while still warm, allowing it to conform somewhat to the general interior shape of the module.

In other advantageous embodiments, which permit a minimum amount of the filter module's structural material to be made disposable, the block of filter media can be made removable from the walls of the filter module. The block can have cheesecloth, plastic mesh, or other suitable sheet material embedded on or in its surface (preferably when still warm) to strengthen the block and provide an interface between the block's rough, frangible surface and the walls of the filter module. Advantageously, the non-disposable portions of the filter module (e.g., surrounding walls) can be reused while the disposable portion (the block of filter media) can be removed and replaced.

A coherent block of filter media having a rounded cross section (i.e., without distinct corners) can be structurally supported on its sides by a flexible sleeve. As long as the tray and flexible material are strong enough to contain the fragments, no other structure is required. Advantageously, this embodiment can be fabricated entirely from disposable or easily incinerated materials, with little weight in addition to that of the saturated filter media.

In a block having a circular cross section (not shown), the only counteracting force provided by the sleeve to support the sides of the block is tension around its cross section. Thus, a sleeve of strong flexible material (e.g., sheets of polymer film) can support such a block when wrapped securely about its sides (but not its bottom).

The material can be wrapped about the block of fragments while the block is still warm. The block can then simply rest on a circular tray. (The structure and operation of a tray according to various aspects of the invention are discussed below with reference to FIGS. 1, 9, and 10.) The flexible material supports the agglomerated fragments along the sides of the block. The tray supports the fragments along the bottom of the block and supports the entire weight of the block. In this variation, the polymer film carries out the structural function of a filter module to support filter media, which, in particularly advantageous configurations, is disposed about an open recess.

In operation, the configuration of exemplary filter module 220 (FIG. 2) has particular advantages. (Water flow in an example of the operation of filter module 220 may be better understood with reference to arrows of FIG. 3.) As trash-laden water enters grate 150, the grate blocks bulkier trash items. Smaller trash items pass through grate 150 and through bracket 210. Water with smaller trash items enters open recess 330 of filter module 220. Because exemplary filter module 220 does not have any screening material at its open top, the smaller trash items enter open recess 330 with the water.

Figure 3:
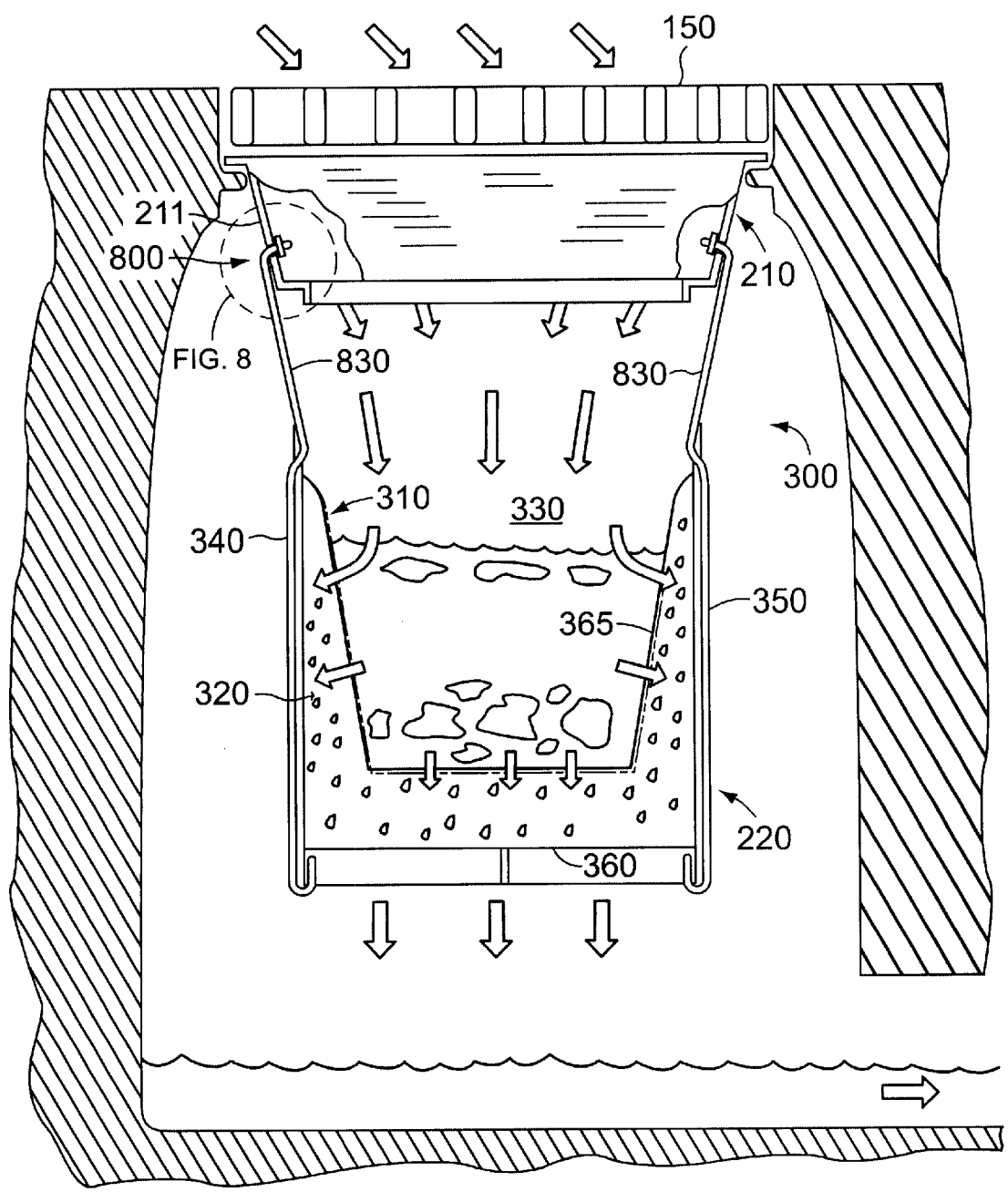
FIG. 3 is a cutaway side view of another filter system installation depicting various other aspects of the invention, some of which can be used with or in place of those in FIG. 1.

In FIG. 3, filter module 220 is depicted as suspending directly beneath bracket 210. The sloped sides of exemplary bracket 210 help direct water down into open recess 330 of module 220 when the water enters the grate obliquely, as does surface runoff. This advantageous functionality of bracket 210 is represented schematically in FIG. 3 by arrows above and below bracket 210.

Water passes through permeable inner basket 365 and enters compartment 310. Some trash items in open recess 330 that are denser than water rest at the bottom of recess 330, leaving the upper portion of inner basket 310 relatively unobstructed. When free, some trash items that are less dense than water float at the top of water in open recess 330, leaving the lower portion of inner basket 310 relatively unobstructed. Consequently, the middle portion of inner basket 310 (i.e., midway between the open top and floor 360 of filter module 220) can often be expected to remain relatively unobstructed until open recess 330 mostly fills with trash.

Surprisingly, accumulated trash can actually enhance performance of a filter module according to various aspects of the invention by enhancing hydrocarbon removal efficiency. In the presence of water, many types of contaminants tend to stick to the materials typically found in trash from urban runoff, such as paper, tree leaves, cigarette filters, etc. By permitting trash to accumulate in recess 330, which is surrounded by filter media 320, filter module 220 advantageously employs trash as a cost-free pre-filtering media that, if desired, can be replaced several times over the useful life of filter media 320. When the trash is cleaned out of open recess 330, contaminants such as oil, silt, sediment, and bacteria that are stuck to the trash are removed with it, without having contributed to the eventual saturation of filter media 320.

Because of the pre-filtering function of trash in open recess 330, the filtering performance of filter module 220 may gradually improve as trash accumulates in recess 330. After prolonged accumulation, however, the trash can be expected to become compacted in recess 330 to the point where it begins to unduly restrict fluid flow into filter media 320. Then, water begins to spill over the sides of filter module 220 and the overall performance of filtering system 300 begins to degrade. To avoid such degradation, trash can be removed from recess 330 periodically, preferably by removing grate 150 and inserting a vacuum hose through bracket 210 and down into filter module 220.

In filter module 220, filter media 320 in compartment 310 surrounds open recess 330, on two opposite sides. (In an advantageous variation, filter media completely surrounds the open recess.) Thus, water can pass through the permeable surface of inner basket 365 in many downward and sideways directions. By providing a large amount of permeable surface area, filter module 220 permits water to enter compartment 310 even when open recess 330 is mostly filled with trash. Though trash items may, obstruct portions of inner basket 365, its relatively large surface area provides ample opportunity for water to get around such obstructions.

The surface of basket 365 need not be smooth, as indents or outdents can increase surface area.

Water entering compartment 310 is purified (to the extent desired for the particular type of filtering being performed) as it passes through filter media 320 toward permeable floor 360. Filtered water passes out of filter module 220 through permeable floor 360 and continues down into the storm drain in which it is installed.

Figure 9:
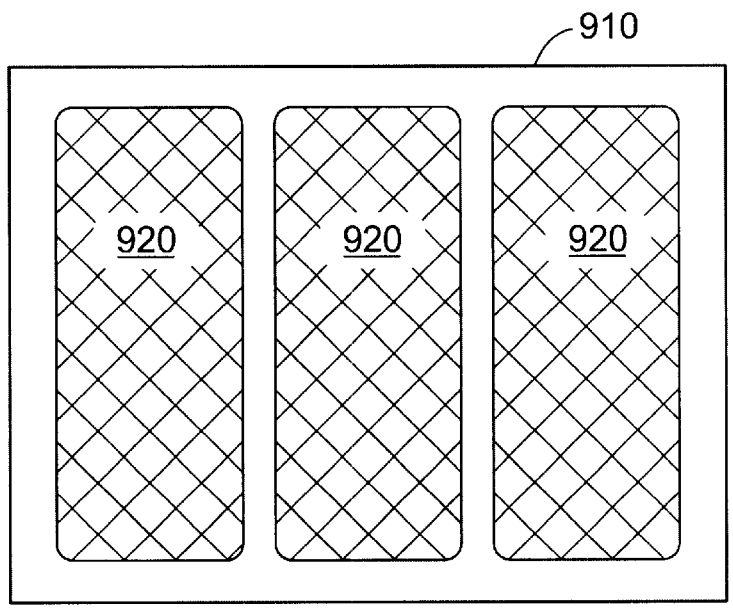
FIGS. 9 and 10 are top and side views, respectively, of a tray used to support a filter module of the filter system of FIG. 1.
Figure 10:
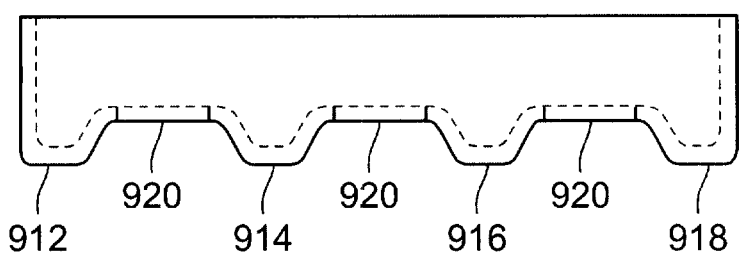

As may be better understood with reference to FIGS. 1, 9, and 10, a filter system according to various aspects of the invention can include a tray that suspends from the system's bracket. In system 100, for example, filter module 120 suspends from bracket 110 indirectly through tray 140. The floor of filter module 120 rests on tray 140.

Exemplary tray 140 is fabricated from a single sheet 910 of suitable material, preferably ABS thermoformed plastic. Sheet 910 includes cutouts 920 (three are depicted in FIG. 9) through which purified liquid from a supported filter module can pass. Preferably, permeable structure (e.g., wire or plastic mesh of the same or different material) covers cutouts 920 to help support the filter module or filter media across the entire bottom of the filter module. In a variation, a tray can employ a multitude of small holes in place of cutouts to provide support and permit purified liquid to pass through the tray. In another variation, the bottom of the tray can be non-permeable, with suitable cutouts or open regions in the side of the tray to permit liquid to pass out of the tray there.

A tray according to various aspects of the invention can include any suitable structural members to appropriately support the maximum expected weight of a filter module. For example, sheet 910 includes four thermoformed structural members 912, 914, 916, and 918 formed an integrally with sheet 910. Members 912 and 918 also form a portion of the sides of tray 900. Members 914 and 916 divide cutouts 920. In variations, structural members can be suitably attached to a tray, for example by adhesive bonding or fasteners. Composite structure can also be employed.

As discussed above, a filter module according to the invention can include a floor, which includes any structure that (1) supports filter media within the module from its bottom and (2) is permeable, typically over a large portion of its surface. In a system where the filter module includes a floor in place of (and not in addition to) a supporting tray, the floor should be configured to support downward forces from water, trash, and saturated filter media of the filter module. For example, floor 360 of system 300 (FIG. 3) can include, or be at least partially configured as, a plastic screen with holes of suitable dimension and shape (e.g., 0.25–0.75 inch diameter circular holes spaced about 0.25 inch apart), reinforced underneath by perpendicular stiffening members. The dimensions of such stiffening members can be selected according to the particular structural requirements of the filter module in which they are implemented. Generally, the members have a height that is significantly greater than their width. The stiffening members can be integral to the bottom surface of the permeable floor (e.g., formed from the same plastic mold) or separate structures fastened to the bottom surface or the side walls. If a suitable supporting tray is used, in an alternate embodiment, the floor of the filter module may be omitted entirely.

By suspending a filter module from a bracket using a flexible support structure, a filter system according to various aspects of the invention achieves a modularity that provides particular advantages. One advantage of this modularity is the ability to mix and match filter module and brackets so that different types of filter modules can suspend from any given type of bracket.

For example, a filter system according to a particularly advantageous aspect of the invention can include a standardized filter module and a bracket sized to fit under a grate having known dimensions. An appropriately sized bracket can be made to fit in a storm drain without the need for fasteners to either the grate or structure of the storm drain. Such a bracket preferably would be made large enough so that it cannot slip out of its position in the storm drain and small enough to ensure its fit into the storm drain.

A bracket can be sized to fit under a grate by being manufactured to known dimensions or by being modified to fit the dimensions of a particular storm drain. Because storm drains tend to have standardized dimensions, at least in a given municipality, a vendor of filter units according to various aspects of the invention can offer a selection of standardized brackets. Advantageously, a filter module (e.g., module 120, module 220) of the invention need not have particular dimensions, so long as it is small enough to it into a particular storm drain. Consequently, the vendor can offer a very limited selection of filter modules (perhaps only one for each type of filtering) along with a wider selection of brackets. The vendor or customer can combine the selected bracket with the standardized filter module for installation in a storm drain of interest.

Figure 5:
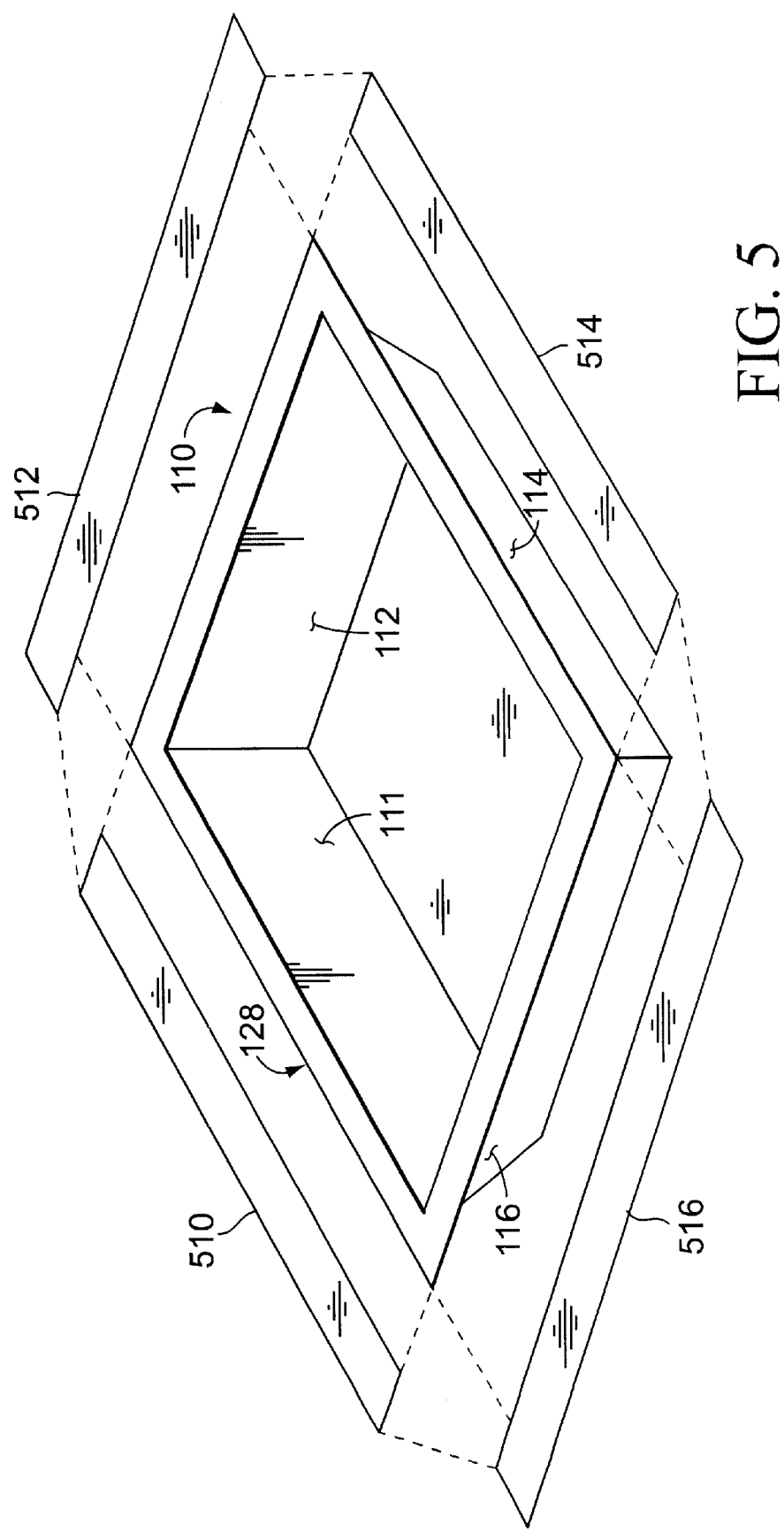
FIG. 5 is a perspective view of a resizable bracket according to various aspects of the invention.

An alternative to offering a selection of brackets is to provide a bracket that can be modified to fit the dimensions of a particular storm drain. As may be better understood with reference to FIG. 5, for example, bracket 110 can be a modified version of a larger bracket that has been sized to fit the upper ledge of the largest commonly encountered storm drains. Outer sections 510, 512, 514, and 516 are shown in FIG. 5 as being cut away from the remaining edge structure 128 of bracket 110.

The original supporting edge structure 128 of the original bracket, which includes sections 510–516, preferably would be suited to support downward forces of filter system 100 even when it rests on a relatively narrow ledge of the widest possible dimensions. In such a configuration, significant bending moment can be expected at the connection between edge structure 128 and walls 111, 112, 114, and 116 of bracket 110. This bending moment can be dealt with by using strong materials or suitable thickening of edge structure 128, especially in areas where significant bending moment is expected. Alternatively or in addition, composite or reinforcing structure can be employed.

A filter system according to another particularly advantageous aspect of the invention can include a standardized bracket and a filter module selected to perform a desired type of filtering. Advantageously, two different filter modules can be configured for optimum use in different situations, such as filtering runoff at different times of the year in a given municipality. An operator performing maintenance in accordance with a method of the invention (discussed below) can replace a filter module suitable for a season just ending with a filter module of another type that is suitable for the next season.

During autumn, for example, filter systems installed in municipalities of the northeastern United States can employ a filter module configured to filter sediment-laden runoff expected in those areas then. The system can employ a second type of filter module, suspended from the same bracket, during other seasons customized to filter typical runoff.

Another example of a situation where different filter modules can be employed with a standardized bracket is filtering runoff at residential and industrial locations. Runoff in industrial locations often contains chemicals in unhealthy concentrations not typically found in residential locations. Filter modules can be specially configured for installation in industrial locations by including special media (e.g., activated carbon) to trap such chemicals.

According to a method of the invention, installing and replacing filter modules in a storm drain can improve purity of water entering the storm drain. For example, filter module 120 of system 100 (FIG. 1) can be replaced when filter media 320 in module 120 becomes saturated and is no longer effective, preferably before that time. By permitting lifting of filter module 120 from the storm drain independently of grate 150, the method avoids the need to lift a heavy filter module and a heavy grate together. The method also avoids the need to disconnect the grate or bracket from the filter module, because they need not be fastened to each other at all.

According to this preferred method, an operator installs a filter module (e.g., module 120) in a storm drain having a grate, suspending the filter module from at least two edges of the storm drain, below the grate. As discussed above, the filter module can suspend from the storm drain's edges via a bracket according to various aspects of the invention. When the filter module must be replaced (e.g., after a predetermined maintenance period, unusual levels of runoff, a spill incident, etc.), a worker removes the grate with the first filter module remaining suspended from the edges of the storm drain, preferably with mechanical assistance. The worker then lifts the bracket and attached filter module out of the storm drain, again preferably with mechanical assistance. The worker replaces the old filter module with a new filter module (of the same or a different type) and finally replaces the grate.

Advantageously, the method permits the worker to avoid having to lift the weight of both the filter module and the grate together. Grates found in storm drains often weigh more than a hundred pounds. A filter module according to various aspects of the invention, when saturated with contaminants, can weigh even more. Mechanical assistance devices configured to lift the weight of the grate may not be designed to lift. the combined weight of the grate and filter module. In addition, lifting the weight of both heavy items makes the lifting operation more dangerous and prone to failure. By separating the weight of heavy items, the method permits a single mechanical assistance device to lift all portions of a filter system according to the invention. The device should be capable of lifting the heaviest portion of the system, e.g., either the grate or a saturated, trash-filled filter module. (The weight of the filter module can be reduced by vacuuming out trash before lifting the module out of the storm drain.)

A worker can use any suitable form of mechanical assistance to lift a bracket and an attached filter module. A lifting tool according to various aspects of the invention provides a particularly advantageous form of mechanical assistance. An exemplary lifting tool 400 may be better understood with reference to FIGS. 4 and 19–27. Tool 400 includes: a set of opposing arms 410 and 420; outward-facing flanges 412 and 422; and a cable assembly 430 connecting respective holes 414 and 424 in upper portions of arms 410 and 420. Tool 400 further includes a pivot 415 by which opposing arms 410 and 420 pivotably connect to each other. Suitable types of pivots include, inter alia, sleeve bearings, ball bearings, and simple fasteners such as rivets and bolt/nut combinations configured to exert limited compression and thus facilitate pivoting.

Opposing arms of a lifting tool according to various aspects of the invention include any generally elongated complementary structures that are connected via a pivot at a suitable midpoint position. Opposing .arms can be fabricated from any materials that provide sufficient structural integrity given the dimensional, costs, and loading constraints of a particular application. For example, opposing arms 410 and 420 of tool 400 are preferably fabricated from a strong, lightweight material such as. stainless steel or a fiber-reinforced plastic. Arms 410 and 420 each have a width (in the plane of their pivoting motion with respect to each other) that is significantly greater than their depth (perpendicular to the plane of motion). By having ample width, especially near pivot 415, opposing arms 410 and 420 are able to transmit sufficient outward forces to flanges 412 and 422 to support bracket 110 and the attached weight of a saturated filter module.

Figure 19:
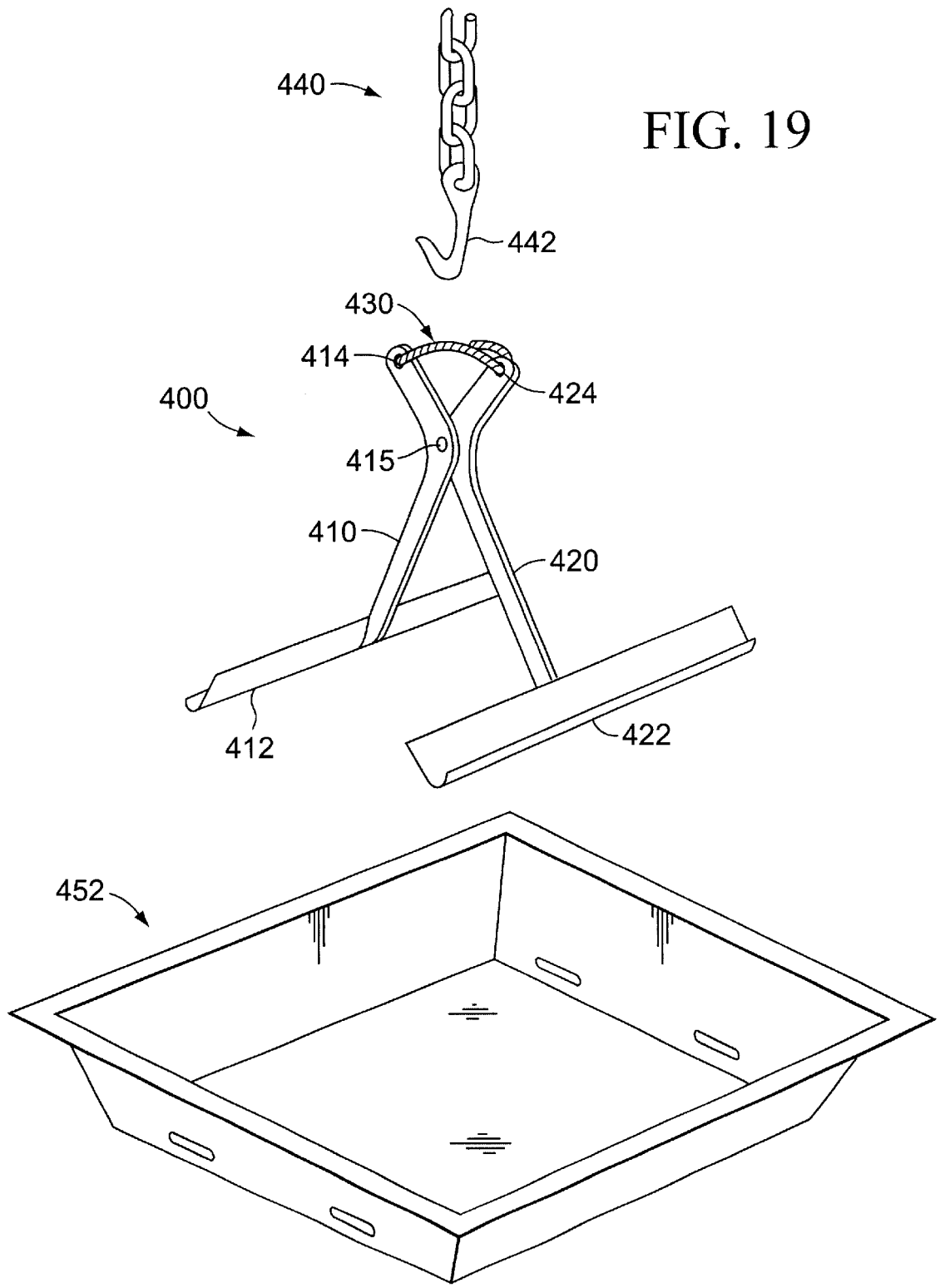
FIG. 19 is a perspective view of the lifting tool and bracket of FIG. 4.

Flanges of a lifting tool can be fabricated in any suitable configuration, and from any sufficiently strong materials to transmit outward and upward lifting forces to a bracket. Exemplary flanges 412 and 422 have "L"-shaped (FIG. 4) or hook-shaped (FIG. 19) cross sections, but a tab-and-slot structure or other suitable structure can also be employed as desired. Preferably, flanges 412 and 422 are fabricated from the same material as, and are welded to, opposing arms 410 and 420. Flanges 412 and 422 can include thickened portions (not shown) on their undersides to provide additional cross-sectional stiffness. Flanges 412 and 422 can (but need not) have substantial length in the direction perpendicular to FIG. 4, as illustrated in FIG. 19.

Figure 4:
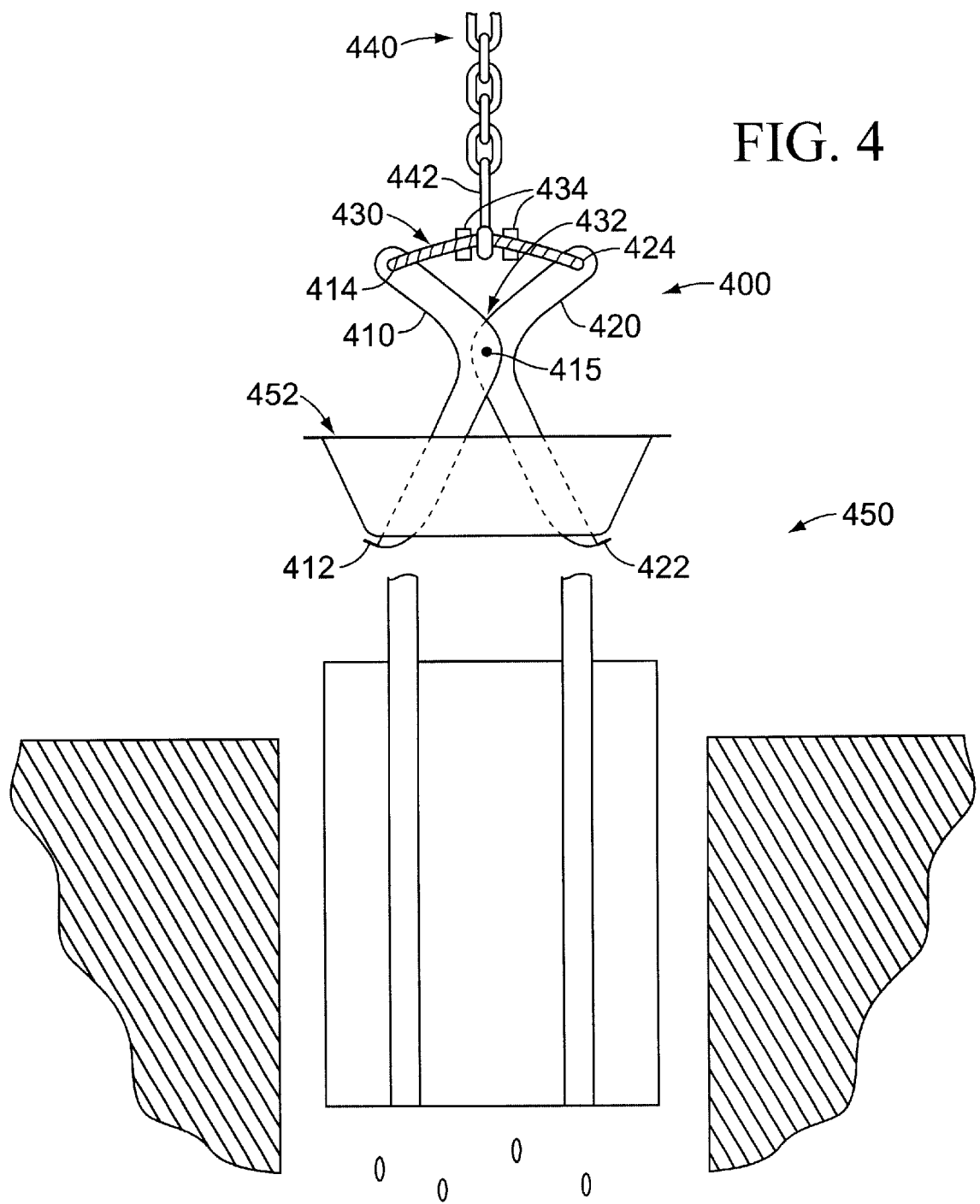
FIG. 4 is a simplified side view of a filter module being lifted out of a storm drain according to various aspects of the invention.

FIG. 4 shows a simplified side view of a filter system 450 (having a bracket 452) being lifted out of a storm drain with lifting tool 400. A suitable lifting mechanism such as a winch or crane (not shown) attaches to tool 400 via a chain 440, which is partially shown in FIG. 4. (Other structure for conveying upward force to lifting tool 400, such as a cable or strap, can also be suitably employed.) As may be better understood with reference to FIG. 20, upward force on chain 440 is translated into upward and outward forces at flanges 412 and 422. When tool 400 engages bracket 452, the upward force on each flange 412 and 422 lifts bracket 452. The outward forces on flanges 412 and 422 push them against the inner bottom edges of bracket 452, keeping them securely engaged with bracket 452.

Chain 440 includes at its lower end a conventional hook 442 that engages cable 430. Cable 430 connects upper portions of arms 410 and 420 securely through holes 414 and 424, the edges of which can be suitably rounded to avoid chafing and distribute strain on cable 430. Cable 430 can be connected by any suitable technique, such as swaging into metallic eyes or turnbuckles, or by being conventionally formed into loops around protective structure (e.g., metallic teardrop-shaped eyes of the type used in sail rigging). Many alternatives to cable 430 can be suitably employed. For example, a pair of rods or elongated chain links can connect to holes 414 and 424 and to each other. Alternatively, an additional pair of opposing arms can connect to the upper portions of arms 410 and 420, and to each other, through three additional pivots similar to pivot 415. Rope of sufficient durability (perhaps covered with a rugged plastic) can also be employed.

Figure 20:
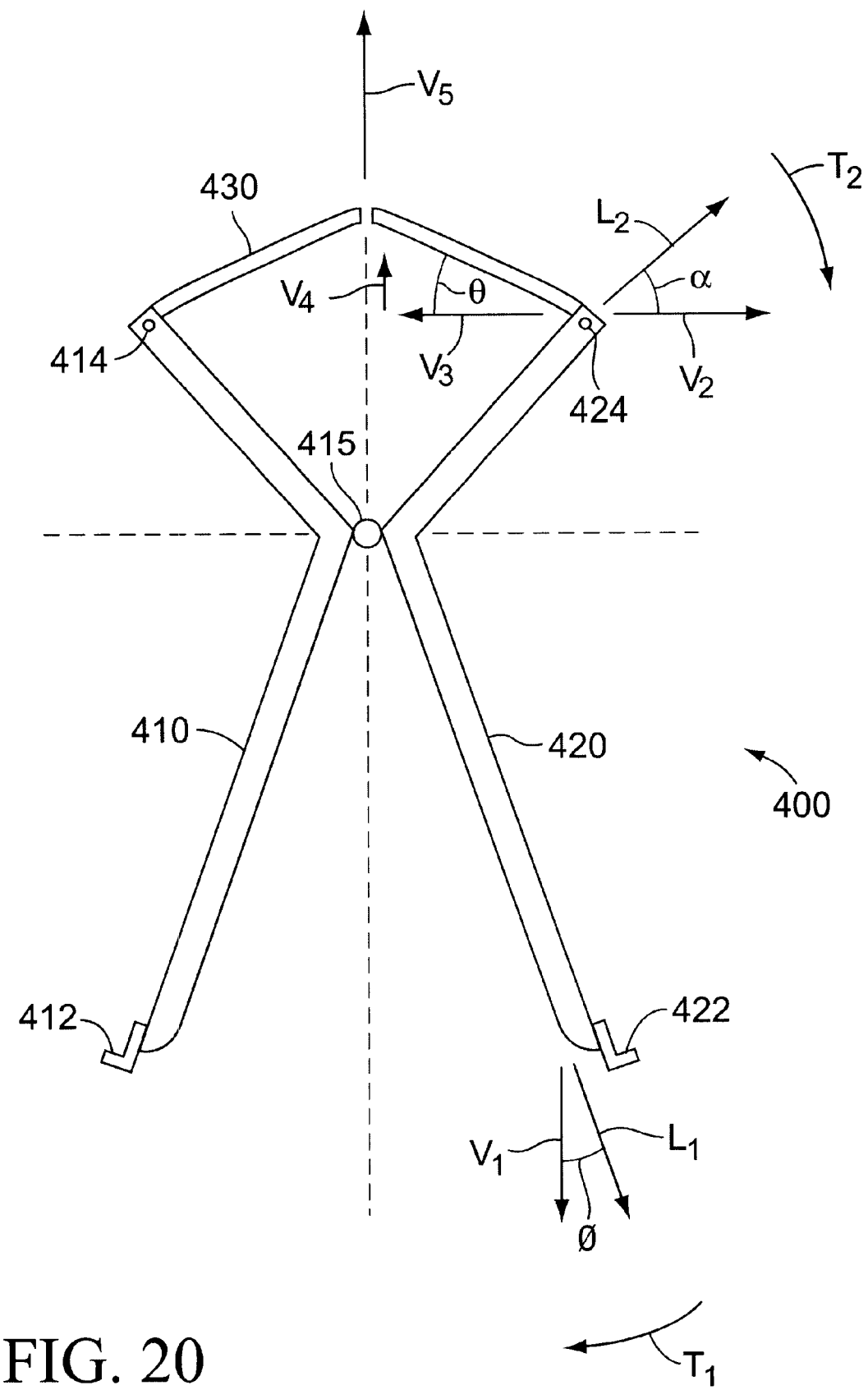
FIG. 20 as a schematic side view of the lifting tool of FIG. 4 illustrating translation of upward force into upward and outward forces.

TABLE II lists exemplary dimensions of lifting tool 400 (FIG. 20). These dimensions should only be considered estimates illustrative of a presently preferred embodiment, not a requirement for implementation of any aspect of the present invention.

TABLE II

| Component or Unit | Exemplary Dimension |
| --- | --- |
| Arms 410, 420 - lower portion length | 15 inches |
| Arms 410, 420 - upper portion length | 6 ½ inches |
| Arms 410, 420 - width (in pivot plane) | 2 ½ inches (preferably thicker near pivot 415) |
| Cable 430 - length | 10 inches |
| Angle θ | 22 degrees |
| Angle φ | 28 degrees |
| Angle α | 44 degrees |

FIG. 20 is a schematic view of lifting tool 400 illustrating the translation of upward force on cable 430 to upward (lifting) and outward (securing) forces on flanges 412 and 422. Upward force on cable 430, which is depicted in FIG. 20 by vector v5, results in approximately balanced upward forces on flanges. 412 and 422. The symmetry of tool 400 causes force v5 to translate through opposing arms 410 and 420 in a symmetric manner. Consequently, FIG. 20 only depicts the translation of forces through arm 420.

Downward force on flange 422, depicted by vector v1, is somewhat non-parallel to the lower portion of arm 420. Vector L1 represents the length and direction of that lower portion. The deviation between vectors v1 and L1, depicted by angle φ, applies a torque about pivot 415, which is depicted by arrow T1, which has an associated vector conventially shown as parallel to the axis of pivot 415. Because arm 420 is rigid (except for some "give," depending on its structure and materials), torque T1 is equivalent to another torque T2. Torque T2 translates to a deviation in force from the upper portion of arm 420, the length and direction of which is depicted by vector L2. This deviation is depicted by vector v2, which deviates from vector L2 by an angle .

Without a counteracting force pulling inward on the upper portion of arm 420, the force of vector v2 would push flange 422 outward as a result of the deviation between downward vector v1 and the lower portion of arm 420. However, the advantageous configuration of tool 400 provides a counteracting force that exceeds the magnitude of vector v2. This counteracting force, depicted by vector v3, results from tension on cable 430.

Cable 430 is slightly longer than the minimum distance between holes 414 and 422, which cable 430 connects. One half of cable 430 can be viewed as the hypotenuse of a right triangle, with the run and rise of the triangle being depicted in FIG. 20 by vectors v3 and v4, respectively. Vector v4 has the same magnitude as vector v1. Vector v3 is considerably larger than vector v4, due to the relationship v4=v3 * tan θ and the fact that θ is relatively small, about 22 degrees in the exemplary embodiment of TABLE II above.

FIGS. 21–27 depict, in sequence, a mathematical derivation of an equation that specifies conditions under which vector v3 is believed to be greater in magnitude than vector v2. The equation and derivation thereof, which are believed but not absolutely known to be accurate, should be viewed as merely illustrative of the presently preferred lifting tool configuration and not as a requirement for implementation of any aspect of the present invention.

Under conditions that satisfy the above equation, the upper portion of arm 420 will experience an inward force and the lower portion of arm 420 will experience an opposing outward force. Although the forces acting on arm 410 are not depicted in FIG. 20, the symmetry of tool 400 makes it clear that the lower portion of arm 410 will experience an outward force of substantially equal magnitude. When flange 422 and flange 412 are in contact with bracket 452, these outward forces secure them against the inner bottom edges of bracket 452.

To keep, arms 410 and 420 pivoted inward (i.e., with flanges 412 and 422 close together), an operator can, support tool 400 from around pivot 415 rather than from cable 430 when passing tool downward through the inner aperture bracket 452. In a variation, tool 410 can include suitable biasing structure (not shown) to keep arms 410 and 420 pivoted inward by default. One example of such structure is a segment of bent spring steel that is securely bonded on both sides of its midpoint to the inner surfaces of the upper parts of arms 410 and 420, respectively, just above pivot 415. By biasing the lower portions of arms 410 and 420 in an inward direction (i.e., more acute with respect to each other), flanges 412 and 422 can pass through the inner aperture of bracket 452 and, when one flange has engaged bracket 452, push outward from each other by translated upward force on cable 430. Cable 430 can have stops or sleeves (e.g., sleeves 434 depicted only in FIG. 4) securely attached about its midpoint to keep hook 442 from sliding away from the midpoint.

Lifting tool 400 includes a stop 432, shown only in FIG. 4, to limit the outward spread of flanges 412 and 422 and thus prevent lateral (as opposed to upward) strain on opposite walls of bracket 452. Stop 432 can be a short segment of strong material having a cross-section suitable to prevent the upper portion of arm 410 from moving too far inward toward the upper portion of arm 420. The cross-section of stop 432 depicted in FIG. 4 provides an abutment relatively parallel to the contacting surface of arm 410 and a base parallel to the mounting surface of arm 420. Other structure suitable for limiting the outward spread of flanges 412 and 422, such as blocks mounted just above pivot 415 on one or both of opposite arms 410 and 420 or a tensile member below pivot 415, can also be employed.

An alternative lifting tool (not shown) advantageously employs the same principle used in conventional toggle bolts. This alternative tool includes a horizontal rod suspended from its midpoint by a vertical rod, chain, or other suitable tension-bearing member. The tool includes two pairs of opposing arms, one at each end of the horizontal rod. The opposing arms in each pair are mounted on the rod such that they can pivot with respect to each other, but only over a limited angular range. The minimum angle between opposing arms in each pair is fairly small, such that the ends of the arms can point upward, acute to each other, toward the direction from which the tool is suspended. The maximum angle between opposing arms is slightly less than 180 degrees, such that the fully open arms form a relatively linear cross-member that is perpendicular to the horizontal rod.

When the alternative tool is lowered into the inner aperture of a bracket (e.g., bracket 452), the opposing arms in each pair are free to yield to the walls of the bracket and pivot slightly toward each other until the tool clears the bottom of the bracket. Then, the opposing arms fall outward and away from each other to form a relatively linear cross-member. An optional spring can help bias the opposing arms outward. When the tool is raised upward, the opposing arms fit under opposing walls of the bracket to support it. Optional notches, indents, or scallops at points on the bottom edge of the walls of the bracket can help engage the arms of this lifting tool or the others here disclosed.

Another alternative lifting tool employing the toggle bolt principle includes opposing arms in two pairs that are oriented perpendicular to each other. Advantageously, the opposing arms can extend radially outward from a single point of support, which may enhance stability. Another alternative lifting tool employs pivoting arms that do not directly oppose another arm pivoting in the same plane. An example of such an alternative tool has only three arms that can each pivot downward to an orientation near horizontal (i.e., perpendicular to the orientation of the supporting rod, chain, or other tension-bearing member).

An alternative lifting tool that advantageously omits pivoting members includes a vertically-oriented tension-bearing member and four fixed arms that extend radially outward (in a "plus" configuration) from a common point of connection to the tension-bearing member. When suitably dimensioned with respect to a square bracket, a tool can be passed through the inner aperture of the square bracket by rotating the arms about the tension-bearing member in their common plane until the ends of the arms are just inside the corners of the bracket. The arms can then passed through the inner aperture of the bracket and rotate 45 degrees so that their ends extend slightly beyond the walls of the bracket, at the bottom midpoint of the walls. Preferably, the walls have indentations such as discussed above to secure the arm ends at the midpoints of the walls. Once secured, the tool can be lifted up along with the bracket suspended from its arms and along with the filter module suspended from the bracket.

The opposing arms can be any suitable structure that can, when extended, support the weight of the bracket and a suspended, saturated filter module. In one variation, a first arm in each pair can be fabricated from sheet metal having opposite walls whose planes are normal to the horizontal rod. In such a variation, a second arm in each pair can be fabricated from sheet metal of similar configuration except with opposite walls separated slightly less so that the opposite walls of the second arm can fit inside the opposite walls of the first arm when the opposite arms are acute with respect to each other.

A preferred type of media for a filter module according to various aspects of the invention is disclosed in commonly owned U.S. Pat. No. 6,106,707 entitled "Curb-Inlet Storm Drain Systems for Filtering Trash and Hydrocarbons," to Morris and Stelpstra, the present inventors, which is incorporated herein by reference along with any documents incorporated by reference therein. When media 320 includes fragments of such copolymer material, and oil-water runoff comes into contact with the fragments, the copolymer material will absorb and entrap the oil. Because the copolymer material is hydrophobic, however, it will not become waterlogged, and water will pass out of the filter module. After suitable copolymer material has absorbed oil, subsequent runoff flowing past the material will not wash away the oil. Indeed, it has been found that the materials described herein can remain in contact with water continuously or intermittently for at least several months, and perhaps indefinitely, without releasing the oil or allowing it to emulsify.

Figure 6:
FIG. 6 is an outline view of a sample copolymer fragment for use in the filter module compartment of the filter system of FIG. 1.

FIG. 6 shows an example of a suitably formed copolymer fragment 630, for use inside compartment 310 of system 300. The principal ingredient of fragment 630 is a copolymeric material that is known to sorb oil but not water. In the preferred materials, fragments 630 are compliant or flexible.

As oil enters fragments 630, they expand somewhat. Thus, it is preferred to avoid filling compartment 310 completely with fragments 630, to prevent fragments 630 from pushing upwards into basket 365 as they expand with oil absorption.

Particularly suitable types of copolymers fall within the class of thermoplastic elastomers, such as styrene-butadiene-styrene ("SBS"), which is a styrenic block copolymer. Styrenic block copolymers were developed for applications that require impact resistance, and that is still their primary use. SBS is highly sorbent, non-toxic, and remains coherent after it is oil saturated. An alternative styrenic block copolymer is styrene-isoprene-styrene ("SIS").

In a preferred embodiment formed in accordance with the preferred process described below, SBS material formed into granules is mixed with granulated binder material. In that embodiment, granular porous SBS with about 30% styrene has been found suitable, when sifted to retain particles in the range of sizes between about 4 and 24 mesh. Preferably, the SBS product is manufactured without talc, contrary to the standard manufacturing process, to enhance inter-granular linking or bonding in the formed body.

The preferred binder material is a compliant or flexible, hydrophobic, olefinic polymer material in a granular form and having a melting point lower than that of the oil-absorbent copolymer. Polyolefin thermoplastic elastomers, such as ethylene propylene ("EP") rubber or ethylene propylene with a diene monomer ("EPDM") have been found suitable. The binder largely prevents fragments 630 from crumbling while being handled in dry form, yet also absorbs a certain quantity of oil. In a preferred embodiment, EPDM granules sifted to retain particles between about 12 and 24 mesh were found suitable. Particles in the range of 6–24 mesh can also be suitably employed.

About 70–90% by weight of the material of fragments 630 consists of SBS and the remainder of EPDM binder. As explained below, SBS and EPDM granules are mixed and formed into fragments 630 in a way that results in SBS granules in an EPDM matrix.

Polymer fragments in filter media according to various aspects of the invention are preferably fabricated with two main design goals in mind. First, the flow of desired liquid (e.g., water to be purified) should not be unduly restricted. Restricted liquid flow limits the rate at which the liquid can be purified. Second, the liquid should be prevented, to the extent practical, from collecting into channels. When liquid collects into channels within a mass of filter media, it tends to come into contact with only the limited amount of filter media that surrounds the channels. Fragments 630 are irregularly shaped and not in powder form, which addresses the first concern by preventing them from being too compactly packed inside compartment 310, because that may restrict the flow of water. The random shapes of fragment 630 address the second concern by moving liquid laterally in compartment 310, thereby further reducing the tendency of the liquid to collect into channels.

To permit faster oil absorption and less gel blocking (a phenomenon in which a layer of absorbed oil at the exterior blocks access to inner portions of fragments 630), without increasing the distance from surface to center, it is desirable to avoid smooth exterior "skins" on outer surfaces of fragments 630. The preferred process of formation discussed below promotes this goal.

Figure 7:
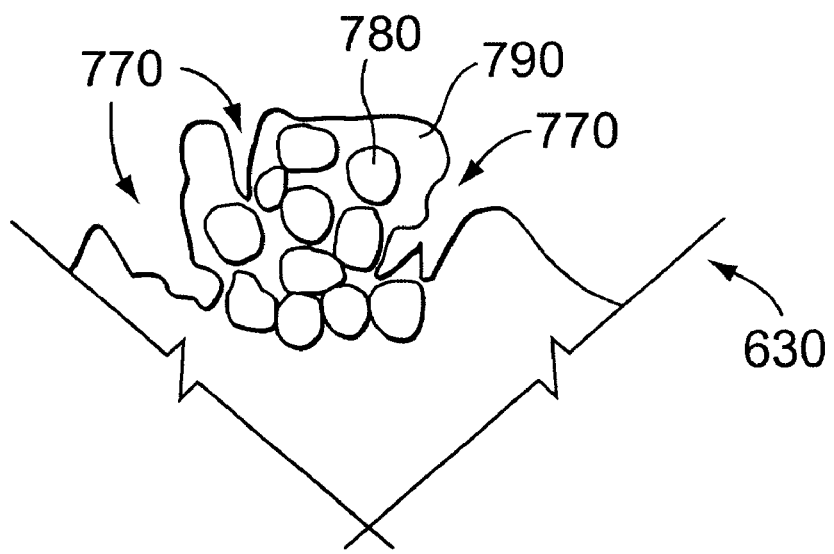
FIG. 7 is a detailed view of a section of a fragment such as the one of FIG. 6.

Also to reduce gel blocking, fragments 630 preferably have numerous fissures 770 extending into them from exterior surfaces and passing between the grains of SBS, as illustrated in FIG. 7. Such fissures increase the effective surface area of fragments 630 while still maintaining each as a coherent whole, permitting easy handling. The preferred formation process discussed below promotes this goal.

In one example, fragments 630 consisted primarily of irregularly shaped objects with various dimensions about a centimeter or two across. Those fragments 630 were formed of 78% SBS and 22% EPDM and had a bulk density of about 0.6 g/cc and mostly weighed about 2 to 3 grams each. Some of the fragments had broken into smaller pieces, some of which weighed as little as 0.3 to 1 grams. A few fragments consisted of pairs of normally sized fragments that had linked together, forming larger fragments about 5 to 6 grams each.

Fragments 630 have controlled bulk density, also to reduce gel blocking. With the preferred materials discussed above, bulk density greater than 0.75 g/cc tend to prevent the oil from entering the fragments, while bulk density smaller than 0.35 g/cc cause the fragments to fragment more easily, either when dry or after absorbing oil. For example, copolymer fragments 630 with a bulk density in the preferred range have enough inter-granular voids to permit oil to penetrate substantially throughout the thickness of the larger fragments 630, thereby avoiding gel blocking, while leaving them mostly intact. Fragments of such material can absorb up to five times their weight in oil.

One method of forming fragments 630 applies a modified extrusion process. SBS and EPDM granules are placed in the hopper of an extruder of conventional design (e.g., a two-inch Bonnot lab extruder with.a hot-water external barrel heat exchanger) which maintains the temperature of the granular material near about 145° F., far below normal extrusion temperatures for plastic products. The heat exchanger should not permit the temperature of the granular material to exceed 160° F. As discussed below, a particularly advantageous method of forming filter media permits SBS fragments to become agglomerated while still warm enough to establish molecular bonds.

In the barrel of the extruder the EPDM quickly becomes softened, as a result of heat caused by sheanng forces that result from mechanical agitation by the screw. To maintain the temperature of the granular material near the desired temperature, the heat exchanger typically acts as a cooling device to conduct some of this heat away from the material. At the beginning of the process and any other appropriate times, the heat exchanger can apply heat to the material to raise it to the desired temperature.

The extruder's screw mixes the softened EPDM and the SBS, forming a matrix of EPDM surrounding and interlinked to SBS granules. Because the SBS does not melt, some air spaces (i.e., bubbles) remain in the mixture. The softening process occurs quite rapidly in the extruder, permitting very short dwell times (such as less than one minute), which permits rapid manufacturing.

The composite material is pressed through a circular die with a central rod or mandrel, at a unit flow rate of about 6 g/sec. in one embodiment using a cross section of particular size. If left undisturbed at this flow rate, the material would form a cylindrical body with an axial hole. However, radial arms at the end of the. die, or a similarly configured cutter just outside the nozzle, section the cylindrical bodies into segments, perhaps four sections. An automatic knife fires every two seconds or so, cutting off lengths of the sections.

Another way of producing such fragments is to use a smaller die, with a hole approximately one centimeter across, to produce the fragments directly rather than by cutting them radially from a cylindrical form.

Upon passing through the die, the SBS granules, which have compressed somewhat from being forced through the die, re-expand, "fluffing" the extruded material while it slowly cools. Air remaining in the mixture further assists the expansion. After the extruded material is cut into suitable lengths, it slowly cools outside the extruder, and the granules continue to expand for a time, causing additional fluffing.

The EPDM matrix 790 (see FIG. 7) forms a durable but permeable structure for the SBS granules 780 and provides mechanical integrity to resulting fragments 630. Thus, fragments 630 formed in accordance with the preferred method resist breaking or cracking absent extreme elastic deformation, despite the presence of fissures 770. Also, fragments of such bodies do not detach easily in the form of flakes, crumbles, or dust.

The fluffing effect (conventionally undesired in extrusion processes) is actually beneficial in the inventive process because it forms inter-granular fissures 770 in the EPDM matrix, throughout the structure. However, the fissuring is not so great as to cause loss of structural integrity. As noted above, fissures are preferred to facilitate rapid passage of oil into fragments 630 and to reduce the incidence of gel blocking, permitting continued absorption.

Slight irregularities in the flow rate, the fluffing effect, and the way in which the knife cuts the material can cause fragments of different sizes to form. For example, a larger-than-normal fragment can form when two adjacent sections link together. A smaller-than-normal fragment can form when a section breaks apart if fissuring caused by fluffing happens to occur along a fracture line. The resulting fragments 630 are similar in size and general appearance to popcorn.

As discussed above, a particularly advantageous method of forming filter media forms a coherent block of filter media from fragments of media that become agglomerated while warm enough to establish molecular bonds between fragments. In the method, the fragments are fed directly from a heat-generating process, (e.g., extrusion) into a form. The fragments are allowed to cool after suitably filling the form to form a coherent block of media within the form. The form can then be removed (e.g., by shearing) or left in place as structure for containing the block of media.

Figure 12:
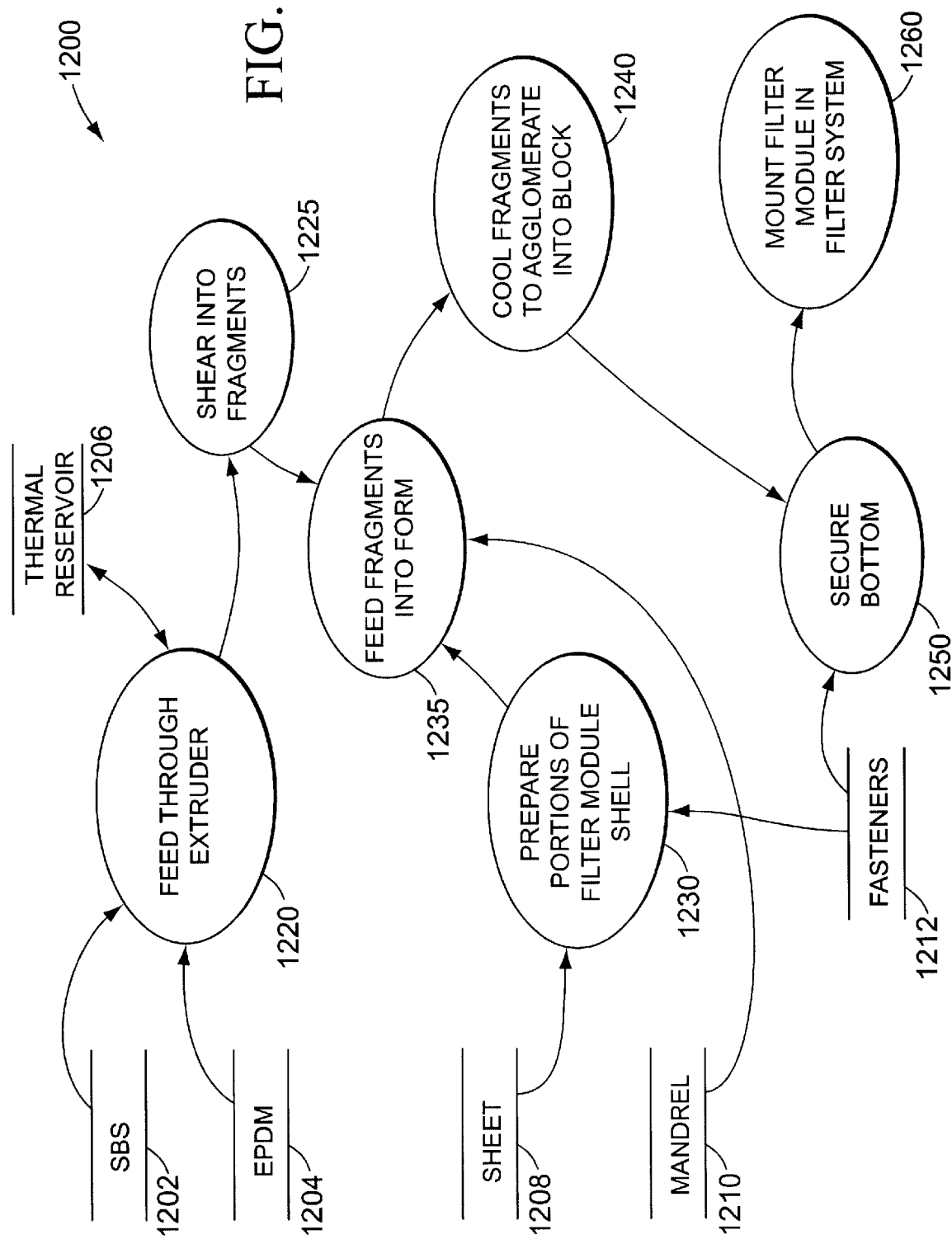
FIG. 12 is a flow diagram of a process for constructing a filter system according to various aspects of the invention.
Figure 13:
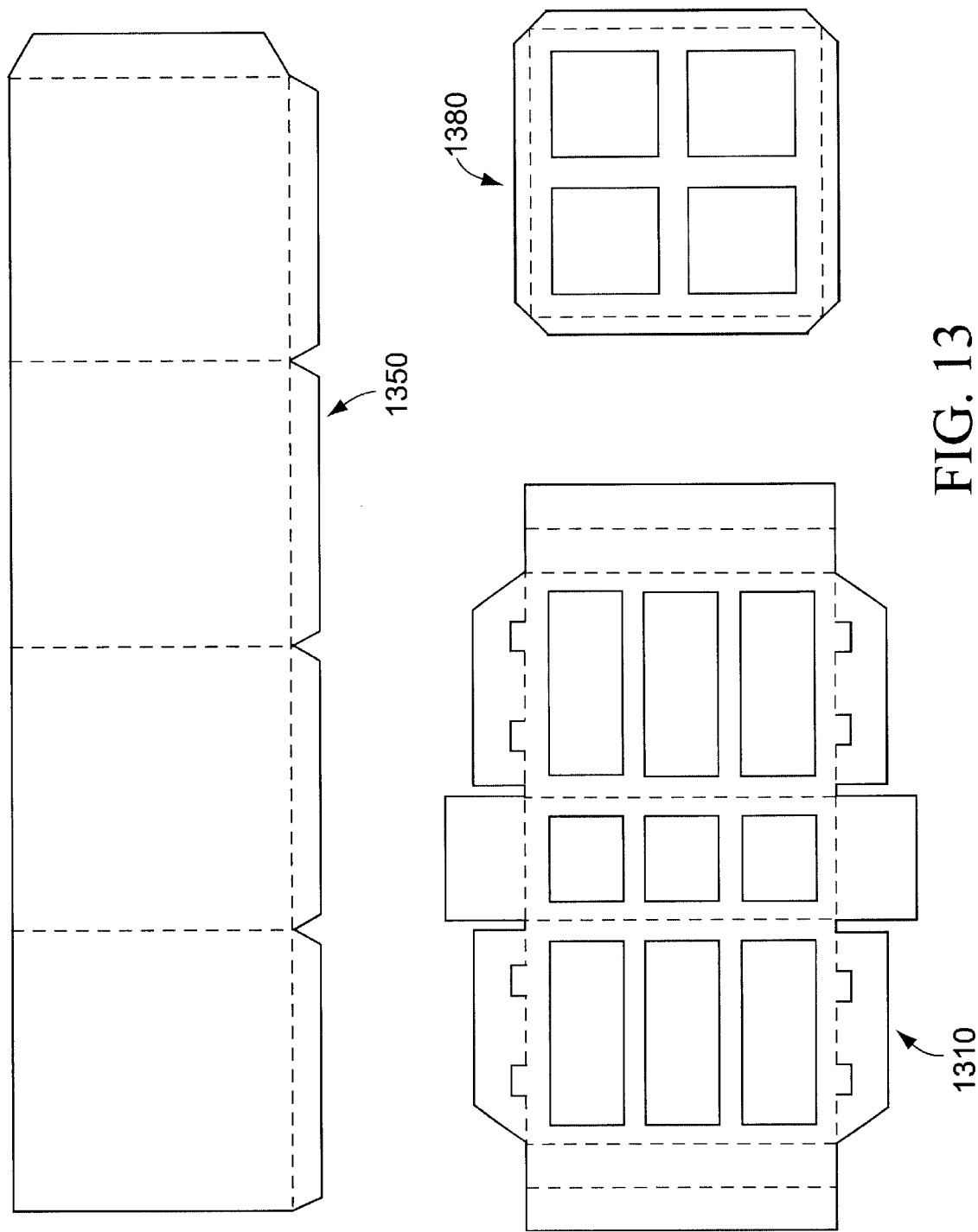
FIG. 13 illustrates a die for forming portions of a filter module in the process of FIG. 12.

An exemplary method for making a filter system according to various aspects of the invention may be better understood with reference to FIGS. 13–18 and the process flow diagram of FIG. 12. Main process 1200 of FIG. 12 includes subordinate processes 1220–1260 that prepare various portions of an exemplar filter module, including filter media and a sectional shell. Other subordinate processes assemble the filter module from these portions and suspend the assembled filter module from a bracket in an operational filter system.

A sectional shell of a filter module according to various aspects of the invention includes any structure that can be assembled from bent and joined planar sections to support filter media. Advantageously, a sectional shell of the invention can assemble entirely from planar sections, simplifying manufacturing and permitting the shell's components to be stacked and stored flat before assembly. The planar sections can be fabricated from a single piece of sheet material, suitably cut and/or folded, or multiple separate sheets.

A sectional shell can include a filter compartment to support loose fragments or filter media or a coherent block of media. Alternatively, a sectional shell can simply provide structural support for a coherent block of media without the need for a filter compartment. In one of many possible variations of a filter module employing a sectional shell according to the invention, the module includes a shell that consists of four interconnected walls. The module further includes a coherent block of media, which is supported along its sides by the walls of the shell. A separate tray can support the bottom of the block. No further structure of significance is required. Such a filter module advantageously requires minimal structural material, making disposal of the entire filter module a more attractive option both environmentally and economically.

Process 1220 begins the preparation of filter media for the filter module by feeding a mixture of SBS 1202 and EPDM 1204 material through an extruder. In an example of process 1220, the mixture consists substantially of 72% SBS (depicted as coming from a supply 1202) and 28% EPDM (depicted as coming from a supply 1204). An extruder and cutting process similar: to that described above can be used to create "popcorn" in the method of FIG. 12 (processes 1220 and 1225). In variations, other mixtures and extruder configurations can be employed.

In one example, the temperature preferably is maintained within a range of 115° F. and 165° F. The range is relatively large because the mixture gradually gains heat, then cools as it passes through the extruder over the course of process 1220. At the conclusion of process 1220 (upon exit from the extruder), the media formed from the mixture may be at a temperature of about 145° F.

As discussed in greater detail below, process 1235 feeds the irregularly shaped fragments produced by cutting process 1225 into a form. A form according to various aspects of the invention includes any structure for receiving and accumulating filter media in a mass of predetermined shape. A form having an open top and one or more recessed regions accessible from the open top can receive filter media through the open top and accumulate it in the recessed regions.

Process 1230 prepares portions of an exemplary filter module shell 1500 from a sheet 1208, as may be better understood with reference to FIGS. 13–16. These portions include a permeable basket 1510 (FIGS. 15, 16) having opposing side walls and a floor, a wall portion 1550, and a floor 1800. As discussed in greater detail below, basket 1510 serves as a form in process 1235 when mounted in wall portion 1550 in an inverted configuration.

In exemplary process 1230, portions 1510, 1550, and 1800 of shell 1500 are formed from sheets 1310, 1350, and 1380 (FIG. 13) of suitable material such as COROPLAST brand corrugated plastic. Sheets 1310, 1350, and 1380 can be formed from one or more larger sheets by a conventional die-cutting process, preferably with minimal wastage of material.

Initially, portions 1510 and 1550 of shell 1500 are pieces of plastic sheet cut out by die 1300, each having several planar sections that can bend with respect to each other. In accordance with various aspects of the invention, pieces of sheet material can be formed, bent, and joined in any suitable manner to assemble one or more portions of a filter module. For example, portions 1510 and 1550 can be assembled into a basket and wall portion, respectively, by bending these planar sections and joining them together.

Figure 14:
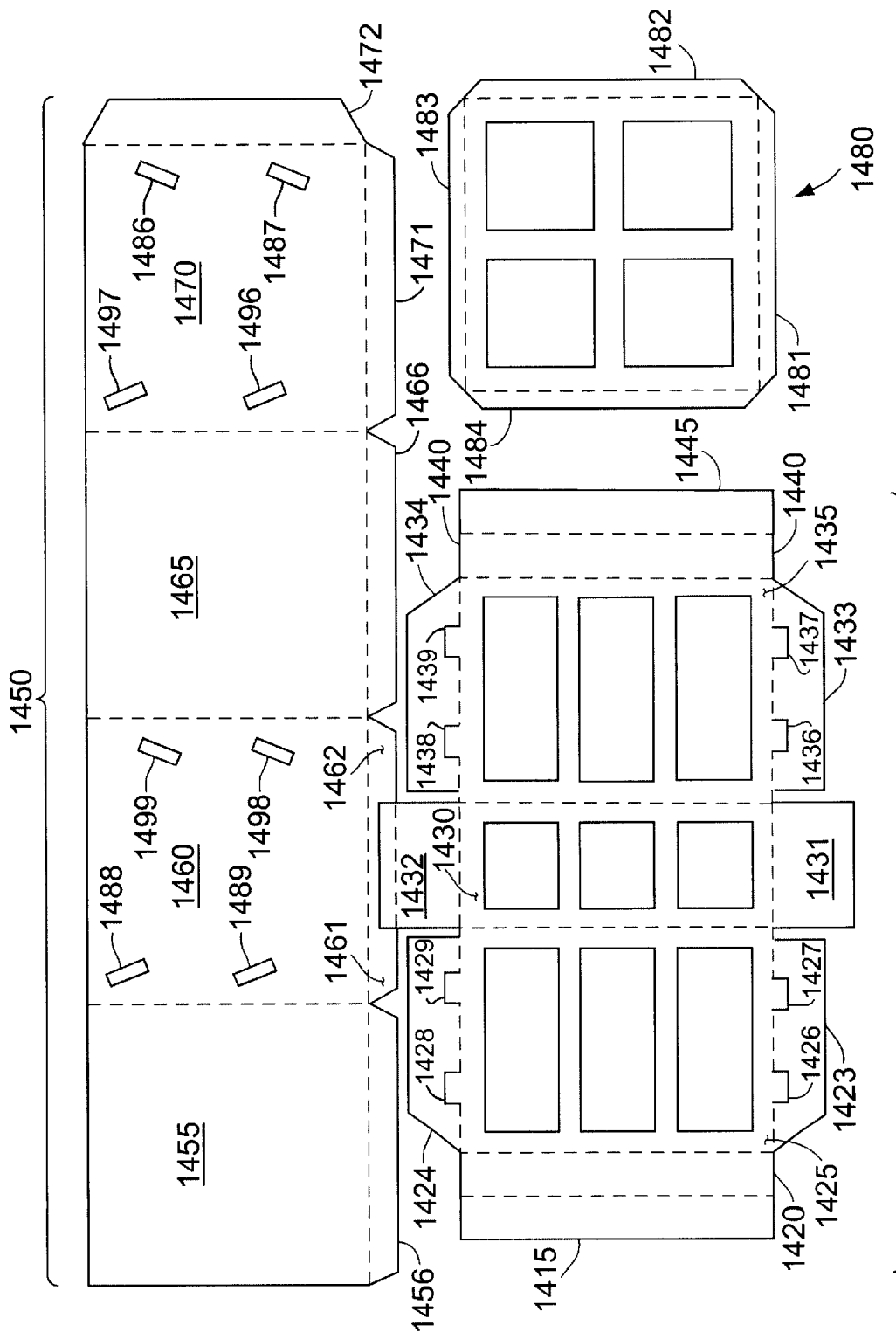
FIG. 14 illustrates portions of a filter module shell formed from the die of FIG. 13.

Bends and interconnections between planar sections of portions 1510 and 1550 may be better understood with reference to FIGS. 14 and 15 and TABLE III below.

TABLE III

| Planar Section or Feature | Interconnected Planar Section(s) or Feature(s) | Portion of the Sectional Shell of the Filter Module After Assembly |
|---|---|---|
| 1415 | 1420 (bend) | Extension flap 1515, having slots to pass strap-type flexible supports. This helps stabilize the filter module when it is suspended from a point beneath its center of miss. |
| 1420 | 1415, 1425 (bends) | Securing flap 1520, attached to side wall |
| 1425 | 1420, 1430 (bends); 1426–1429 (integral) | Basket 1510, side wall |
| 1426–29 | 1486–89 (slots); 1425 (integral) | Tabs 1426–29 and slots 1486–89, respectively, join side wall of basket 1510 to side wall of wall portion. |
| 1430 | 1425, 1435, 1431, 1432 (bends) | Basket 1510, floor |
| 1431 | 1430 (bend) | Suspends basket upside-down in side wall portion during process 1235. |
| 1432 | 1430, 1460 (bends) | Suspends basket upside-down in side wall portion during process 1235. |
| 1435 | 1430, 1440 (bends); 1436–1439 (integral) | Basket 1510, side wall |
| 1436–39 | 1496–99 (slots); 1430 (integral) | Tabs 1436–39 and slots 1496–99, respectively, join side wall of basket 1510 to side wall of wall portion |
| 1440 | 1435, 1445 (bend) | Securing flap, attached to side wall |
| 1445 | 1440 (bend) | Extension flap with slots to pass flexible supports |
| 1455 | 1460, 1456 (bend) | Side wall of wall portion forming part of filter compartment |
| 1460 | 1450, 1461, 1462, 1465 (bend) | Side wall of wall portion |
| 1465 | 1460, 1466, 1470 (bend) | Side wall of wall portion forming part of filter compartment |
| 1470 | 1465, 1471, 1472 (bend) | Side wall of wall portion |
| 1423, 1424, 1433, 1434, 1456, 1461, 1462, 1466, 1471, 1472, 1481–1484 | (various) | Securing flaps attached to various sections of portions 1410, 1450, and 1480 to secure assembly of filter module. |

Once portions 1410, 1450, and 1480 have been cut using die 1300, process 1230 continues with the assembly of filter module shell 1500 from these portions. (Shell 1500 is depicted as assembled in FIGS. 15, 17, and 18.) Bottom section 1430 of sheet portion 1410 folds up (toward a viewer of FIG. 14) such that it is more or less perpendicular to section 1460 of portion 1450. Sections 1425 and 1435 fold upwards such that tabs 1426–1429 and 1436–1439 can slide into corresponding slots 1486–1489 and 1496–1499 of sections 1460 and 1470. Portion 1450 (of which sections 1460 and 1470 are a part) then folds up to surround portion 1410. Filter module shell 1500 forms from portions 1410 and 1450 after assembly and interconnection of those portions, details of which are disclosed in TABLE III above.

Various portions of a filter system according to various aspects of the invention can attach to each other by any conventional technique. For example, portions can attach by adhesive bonding, mechanical fasteners of any suitable type, or welding. Staples and nylon rivets (e.g., "Christmas tree" type rivets presently marketed by Scott Supply Service, Inc.) are two exemplary types of mechanical fasteners that can be employed.

Welding includes any technique that bonds two pieces of material together using the same or similar type of melted and flowed material. Where the portions are made out of plastic sheet material, as are the portions of shell 1500, they can be welded ultrasonically. Ultrasonic plastic welding is a conventional process in which ultrasonically-generated heat melts and fuses plastic of two pieces to form a bond between them.

At some point in process 1230, permeable material (e.g., mesh, screen, etc.) is applied to the large rectangular holes in sections 1425, 1430, and 1435, and also to those in portion 1480. (Portion 1480 forms into floor 1800, as discussed below.) In a variation, these sections can be constructed of material that is permeable over a part of its surface and separate material can be omitted. For example, these sections can be constructed of contiguous plastic sheet with a multitude of holes drilled in portions that are to be permeable.

Figure 15:
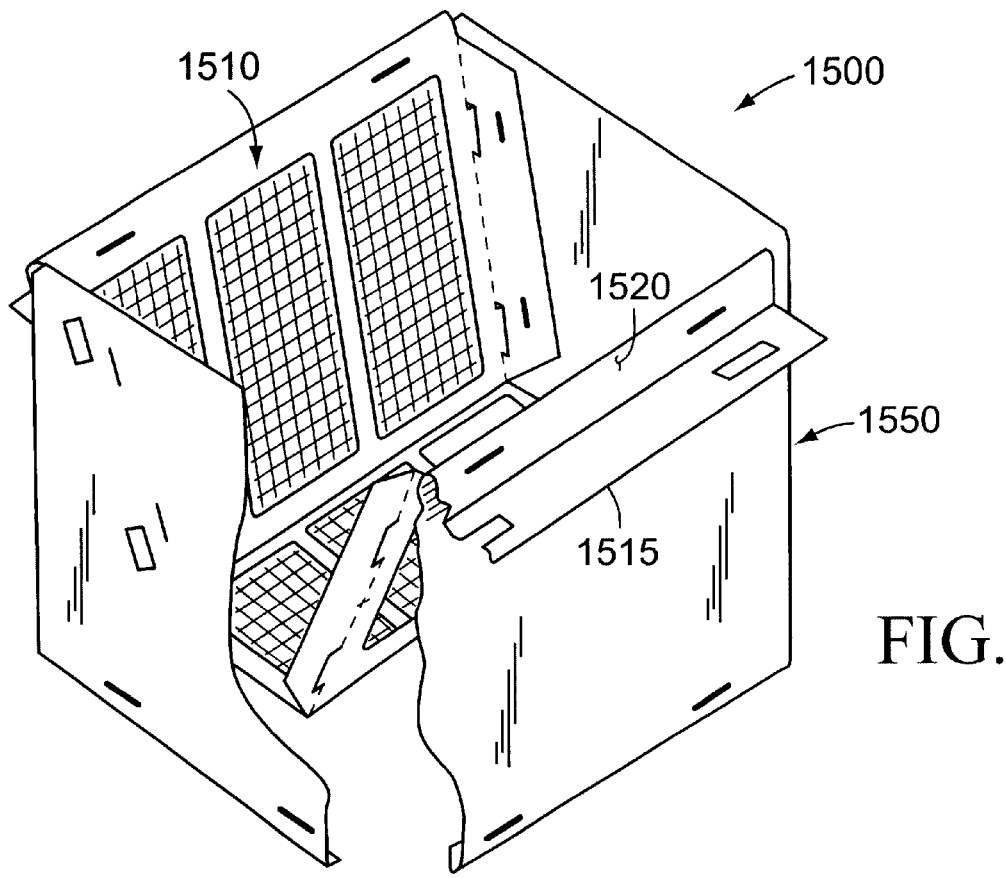
FIG. 15 is a cutaway perspective view illustrating features of a filter module shell formed from the portions of FIG. 14.
Figure 16:
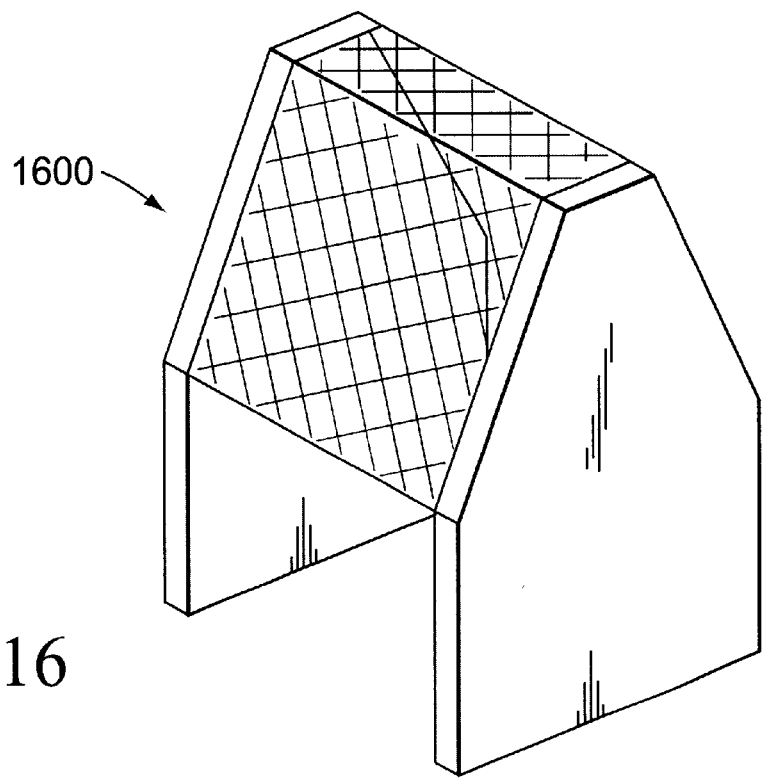
FIG. 16 is a mandrel for supporting a basket of the filter module shell of FIG. 15 during assembly in the process of FIG. 12.
Figure 17:
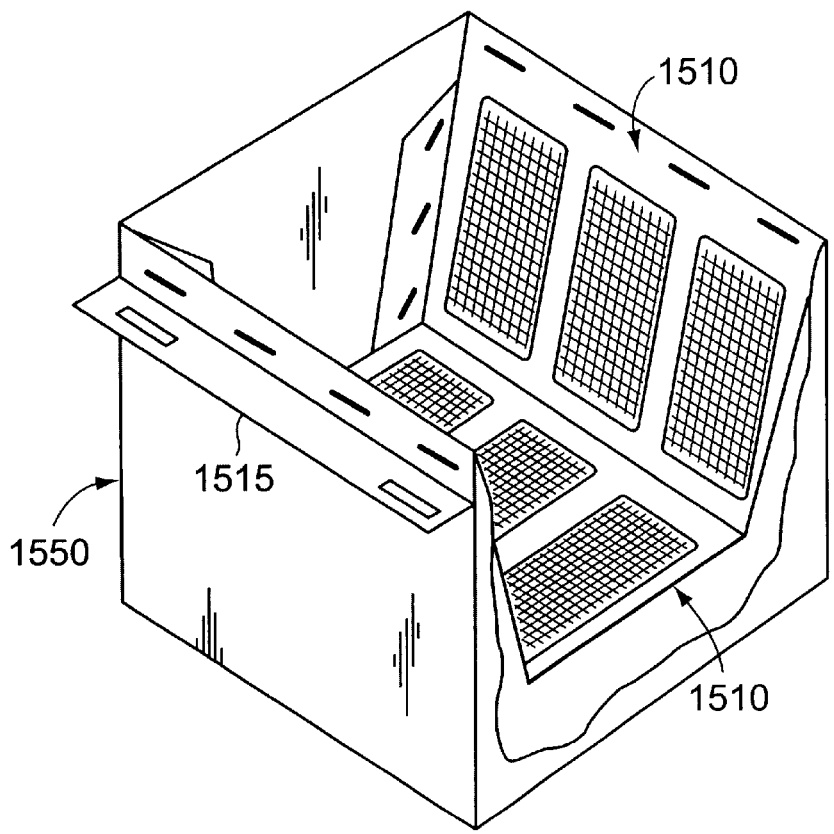
FIG. 17 is a cutaway perspective view illustrating additional features of the filter module shell of FIG. 15.
Figure 18:
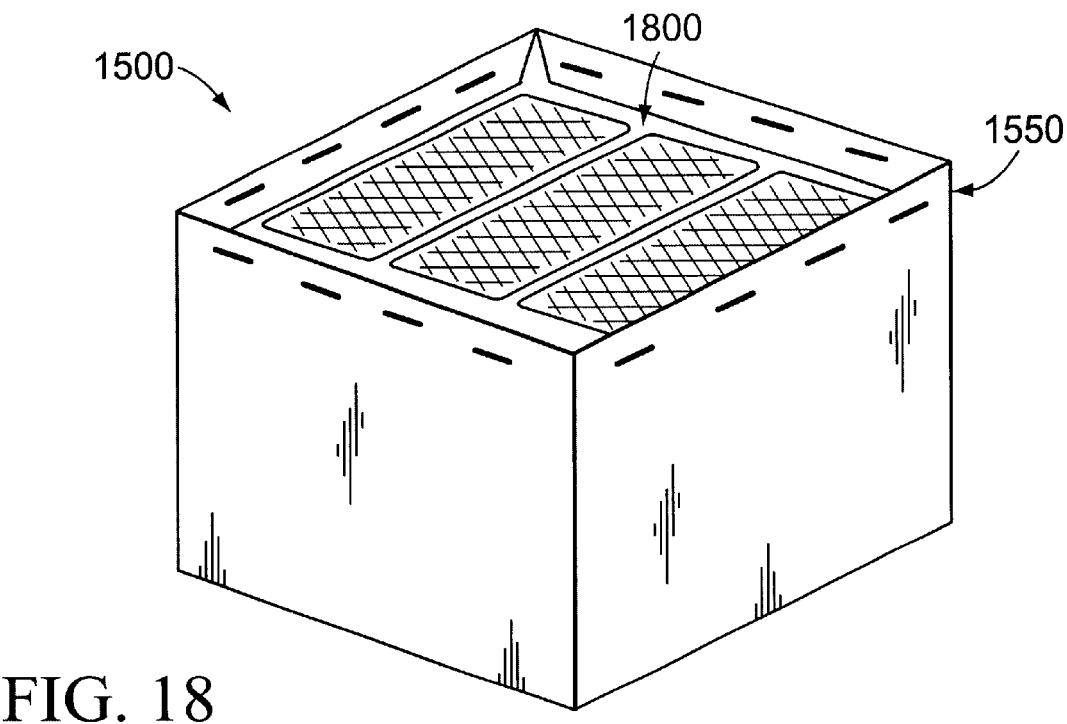
FIG. 18 is a perspective view of the filter module shell of FIG. 15 in an inverted orientation.

As illustrated in FIG. 15, shell 1500 includes a basket 1510 having a permeable floor and sides and a wall portion 1550 in which the basket is secured. At the stage of assembly depicted in FIG. 15, shell 1500 does not include a floor. Indeed, the preferred embodiment made by process 1200, which employs a coherent block of filter media, does not need a floor at all as long as a separate tray is provided to support the filter media at its bottom. However, process 1200 constructs a filter module with floor 1800 of FIG. 18 to help contain ;filter media within shell 1500 during handling.

A basket according to various aspects of the invention includes any structure having permeable surfaces that are arranged to collect large-diameter particles (e.g., trash items) while passing fluid to filter media below the basket. Basket 1510, for example, which is formed from portion 1410 of FIG. 14, includes a permeable floor and permeable side walls arranged near vertically on opposite sides of the floor. The surfaces are made permeable by each having three large cutouts, depicted in FIGS. 14, 15, and 17. At the point of assembly depicted in FIGS. 15 and 17, these cutouts are covered by a polyethylene or polypropylene type mesh.

Processes 1220 and 1230 need not be performed in any particular order, but both need to be complete (along with process 1225) for process 1235 to begin. Process 1235 begins by placing filter; module shell 1500 in an inverted configuration such that it has an open top (where the floor of the filter module will eventually attach) and two recessed regions (defined by the floor and side walls of the basket), which are accessible from the open top. In this configuration, the two regions between the walls of wall portion 1550 and the walls of basket 1510 become tapered recesses on opposite sides of the basket's floor, which becomes a centrally elevated portion.

Process 1235 continues by gravity feeding fragments of filter media (produced by process 1225) into the recessed regions at a temperature sufficient for the development of molecular bonds between adjacent fragments. (For the SBS/EPDM mixture of process 1200, this temperature is about 145° F.) Advantageously, filter media accumulated this way can expand and bond together to form a coherent block of filter media when it cools. In variations where the benefits of a coherent block of media are not required, media can accumulate into a form of the invention at a lower temperature.

In the inverted configuration, a mandrel 1600 (FIG. 16) supports shell 1500. Mandrel 1600 provides plenty of free space beneath the inverted basket 1510 of shell 1500 to promote cooling of the filter media and hasten the conclusion of process 1240.

At the conclusion of process 1240, process 1250 secures a bottom 1800 (FIG. 18) to the portions of shell 1500 assembled by that point. Bottom 1800 is formed from portion 1480 of FIG. 14 and is preferably secured to the rest of shell 1500 with staples.

Process 1200 concludes with subordinate process 1260, which mounts the completed filter module (including media and assembled shell 1500) in a filter system according to the invention. Although systems such as systems 100 (FIG. 1), 200 (FIG. 2), and 300 (FIG. 3) are preferred, a filter module advantageously constructed according to various aspects of the invention can be installed in filter systems that are otherwise conventional. For example, a filter module including a coherent block of filter media or a sectional shell, or both, according to various aspects of the invention can be installed in an in-line filtering structure or in a conventional runoff filter such as those described in U.S. Pat. No. 4,419,232 to Arntyr et al. and U.S. Pat. No. 5,720,574 to Barrela.

PUBLIC NOTICE REGARDING THE SCOPE OF THE INVENTION AND CLAIMS

While the invention has been described in terms of preferred embodiments and generally associated methods, the inventors contemplate that alterations and permutations of the preferred embodiments and methods will become apparent to those skilled in the art upon a reading of the specification and a study of the drawings. For example, a bracket and filter module according to various aspects of the invention need not have any particular cross sectional shape. Although generally rectangular shapes are depicted in the drawings, structures having circular or elliptical cross sections can also be employed. In addition, it is not required that a bracket be free from connection to a grate in an installation of the filter system. In some situations, a limited type of attachment (e.g.,electrical) may be beneficial.

Accordingly, neither the above description of preferred exemplary embodiments nor the abstract defines or constrains the invention. Rather, the issued claims variously define the invention. Each variation of the invention is limited only by the recited limitations of its respective claim, and equivalents thereof, without limitation by other terms not present in the claim. For example, the terminology "media disposed about an open recess" does not require media to be disposed about "the entire perimeter of" an open recess, though that is certainly an option covered by such claim terminology. As another example, claims that do not recite limitations regarding a tray (for supporting a filter module) read on devices and methods that include, and exclude, such a tray. As yet another example, claims not reciting limitations regarding applicants' particularly advantageous lifting tool read on devices and methods that include, and exclude, such a tool.

In addition, aspects of the invention are particularly pointed out below using terminology that the inventors regard as having its broadest reasonable interpretation; the more specific interpretations of 35 U.S.C. §112(6) are only intended in those instances where the term "means" is actually recited. The words "comprising," "including," and "having" are intended as open-ended terminology, with the same meaning as if the phrase "at least" were appended after each instance thereof.

What is claimed is:

1. A filter system comprising:
   (a) a bracket;
   (b) a filter module supporting filter media disposed about an open recess; and
   (c) a flexible support structure coupled between the bracket and the filter module to suspend the filter module from the bracket;
   wherein
   (d) the filter media is in the form of a coherent block of agglomerated fragments.

2. The filter system of claim 1 wherein the flexible support structure includes a plurality of flexible supports.

3. The filter system of claim 2 further comprising a tray coupling the filter module and the flexible supports and supporting the filter module thereon.

4. The filter system of claim 2 wherein the flexible supports include at least one structural element from the group consisting of straps, interconnected links, and cables.

5. The filter system of claim 2 wherein each of the flexible supports includes a releasable coupling structured to be attached to at least one of (1) the bracket and (2) the filter module.

6. The filter system of claim 5 wherein:
   (a) each of the couplings includes a tab secured to the end of a respective one of the flexible supports;
   (b) the bracket includes a plurality of slots, each slot being dimensioned to allow passage of a tab therethrough in a first orientation but not in a second orientation.

7. The filter system of claim 5 wherein each of the couplings includes a hook.

8. The filter system of claim 7 wherein:
   (a) the plurality of flexible supports consists of four supports;
   (b) the bracket has four sides;
   (c) two of the sides include respective pairs of slots, the slots of each pair being near opposite ends of a respective side; and
   (d) each respective hook releasably engages a respective slot.

9. The filter system of claim 1 wherein the bracket includes an upper opening and a lower opening, the upper opening being larger than the lower opening.

10. The filter system of claim 1 wherein the bracket includes a flat supporting edge structure along at least a portion of the perimeter of the bracket, the supporting edge structure extending outward from the bracket.

11. The filter system of claim 10 wherein the bracket and the filter module are both sized to fit within a storm drain of typical dimensions.

12. The filter system of claim 11 wherein:
   (a) the bracket is sized to fit under the grate and includes a flat supporting edge structure along at least a portion of the perimeter of the bracket, the supporting edge structure extending outward from the bracket;
   (b) a filter module sized to fit in the storm drain; and
   (c) flexible support structure coupled between the bracket and the filter module to suspend the filter module from the bracket.

13. The filter system of claim 1 wherein the filter module is combustible.

14. The filter system of claim 1 wherein the filter module further includes a permeable screen separating the filter media from the open recess.

15. The filter system of claim 1 wherein the filter media includes a multitude of irregular, macroscopic fragments of a hydrophobic, oil-absorbent, copolymer material.

16. A filter system comprising:
   (a) a bracket;
   (b) a filter module supporting filter media disposed about an open recess; and
   (c) a flexible support structure coupled between the bracket and the filter module to suspend the filter module from the bracket;
   wherein
   (d) the filter media includes a multitude of irregular, macroscopic fragments of a hydrophobic, oil-absorbent, copolymer material comprising granules of styrene-butadiene-styrene granules and granules of ethylene propylene diene monomer bound together.

17. The filter system of claim 16 wherein the granules of styrene-butadiene-styrene lack talc.

18. The filter system of claim 16 wherein the fragments comprise ethylene propylene diene monomer in the range of about 10–30% by weight.

19. The filter system of claim 16 wherein the fragments substantially consist of styrene-butadiene-styrene and ethylene propylene diene monomer.

20. The filter system of claim 19 wherein the fragments consist of styrene-butadiene-styrene and ethylene propylene diene monomer.

21. The filter system of claim 16 wherein the bracket includes a flat supporting edge structure along at least a portion of the perimeter of the bracket, the supporting edge structure extending outward from the bracket.

22. The filter system of claim 16 wherein the flexible support structure includes a plurality of flexible supports, wherein each of the flexible supports includes a releasable coupling structured to be attached to at least one of (1) the bracket and (2) the filter module.

23. The filter system of 22 wherein:
   (a) each of the couplings includes a tab secured to the end of a respective one of the flexible supports; and
   (b) the bracket includes a plurality of slots, each slot being dimensioned to selectively allow passage of a tab therethrough, whereby:
      (1) the tab can pass through the slot when it has a first orientation; and
      (2) the tab is prevented from passing through the slot when it has a second orientation perpendicular to the first orientation.

24. The filter system of claim 23 wherein:
   (a) each of the couplings includes a hook
   (b) the plurality of flexible supports consists of four supports;
   (c) the bracket has four sides;
   (d) two of the sides include respective pairs of slots, the slots of each pair being near opposite ends of a respective side; and (e) each respective hook of the supports is structured to be releasably coupled to a respective slot of the bracket.

25. The filter system of claim 16 wherein the filter module further includes a permeable screen separating the filter media from the open recess.

26. The filter system of claim 16 wherein the fragments are agglomerated into a block of filter media.

27. The filter system of claim 26 wherein:
   (a) the granules of styrene-butadiene-styrene are in the range of about 6–24 mesh and lack talc; and
   (b) the granules of ethylene propylene diene monomer are in the range of about 10–30% by weight.

28. A filter system comprising:
   (a) a bracket;
   (b) a filter module supporting filter media disposed about an open recess; and
   (c) a flexible support structure coupled between the bracket and the filter module to suspend the filter module from the bracket;
   wherein
   (d) the filter module includes a sectional shell that includes a plurality of planar sections, the sections being joined together such that:
      (1) each section is bendably joined to an adjacent section;
      (2) in a first configuration, the sections lie substantially in the same plane; and
      (3) in a second configuration, the sections do not all lie substantially in the same plane and the sections substantially enclose the filter media.

29. The filter system of claim 28 wherein the bracket includes a flat supporting edge structure along at least a portion of the perimeter of the bracket, the support edge structure extending outward from the bracket.

30. The filter system of claim 28 wherein the flexible support structure includes a plurality of flexible supports, wherein each of the flexible supports includes a releasable coupling structured to be attached to at least one of (1) the bracket and (2) the filter module.

31. The filter system of 30 wherein:
   (a) each of the couplings includes a tab secured to the end of a respective one of the flexible supports; and
   (b) the bracket includes a plurality of slots, each slot being dimensioned to selectively allow passage of a tab therethrough, whereby:
      (1) the tab can pass through the slot when it has a first orientation; and
      (2) the tab is prevented from passing through the slot when it has a second orientation perpendicular to the first orientation.

32. The filter system of claim 31 wherein:
   (a) each of the couplings includes a hook
   (b) the plurality of flexible supports consists of four supports;
   (c) the bracket has four sides;
   (d) two of the sides include respective pairs of slots, the slots of each pair being near opposite ends of a respective side; and
   (e) each respective hook of the supports is structured to be releasably coupled to a respective slot of the bracket.

33. The filter system of claim 28 wherein the filter module is combustible.

34. The filter system of claim 28 wherein the filter module further includes a permeable screen separating the filter media from the open recess.

35. The filter system of claim 28 wherein the agglomerated fragments are irregular, macroscopic fragments of a hydrophobic, oil-absorbent, copolymer material.

36. The filter system of claim 35 wherein:
   (a) each of the fragments comprises granules of styrene-butadiene-styrene granules bound together with granules of ethylene propylene diene monomer;
   (b) the granules of styrene-butadiene-styrene are in the range of about 6–24 mesh and lack talc; and
   (c) the granules of ethylene propylene diene monomer are in the range of about 10–30% by weight.

37. A filter system comprising:
   (a) a bracket; and
   (b) a coherent block of agglomerated fragments of filter media, the block being suspended from the bracket by flexible support structure.

38. The filter system of claim 37 wherein the bracket includes a flat support edge structure along at least a portion of the perimeter of the bracket, the supporting edge structure extending outward from the bracket.

39. The filter system of claim 37 wherein the flexible support structure includes a plurality of flexible supports, wherein each of the flexible supports includes a releasable coupling structured to be attached to at least one of (1) the bracket and (2) the filter module.

40. The filter system of 39 wherein:
   (a) each of the couplings includes a tab 8 secured to the end of a respective one of the flexible supports; and
   (b) the bracket includes a plurality of slots, each slot being dimensioned to selectively allow passage of a tab therethrough, whereby:
      (1) the tab can pass through the slot when it has a first orientation; and
      (2) the tab is prevented from passing through the slot when it has a second orientation perpendicular to the first orientation.

41. The filter system of claim 40 wherein:
   (a) each of the couplings includes a hook
   (b) the plurality of flexible supports consists of four supports;
   (c) the bracket has four sides;
   (d) two of the sides include respective pairs of slots, the slots of each pair being near opposite ends of a respective side; and
   (e) each respective hook of the supports is structured to be releasably coupled to a respective slot of the bracket.

42. The filter system of claim 37 wherein the filter module further includes a permeable screen separating the filter media from the open recess.

43. The filter system of claim 37 wherein the agglomerated fragments are irregular, macroscopic fragments of a hydrophobic, oil-absorbent, copolymer material.

44. The filter system of claim 43 wherein:
   (a) the granules of styrene-butadiene-styrene are in the range of about 6–24 mesh and lack talc; and
   (b) the granules of ethylene propylene diene monomer are in the range of about 10–30% by weight.

* * * * *